(12) United States Patent
Togare

(10) Patent No.: US 7,667,356 B2
(45) Date of Patent: Feb. 23, 2010

(54) MAGNETIC PISTONS ENGINE

(75) Inventor: Radhakrishna Shesha Iyengar Togare, X on Labs 3500 SE. 175th Ave., Vancouver, WA (US) 98683

(73) Assignee: Radhakrishna Shesha Iyengar Togare, Vancouver, WA (US)

( * ) Notice: Subject to any disclaimer, the term of this patent is extended or adjusted under 35 U.S.C. 154(b) by 344 days.

(21) Appl. No.: 11/811,467

(22) Filed: Jun. 11, 2007

(65) Prior Publication Data
US 2008/0012432 A1    Jan. 17, 2008

Related U.S. Application Data

(60) Provisional application No. 60/813,259, filed on Jun. 12, 2006.

(51) Int. Cl.
H02K 7/06 (2006.01)
(52) U.S. Cl. .................. 310/24; 310/15; 310/34
(58) Field of Classification Search .......... 310/15, 310/17–20, 23–26, 31–35
See application file for complete search history.

(56) References Cited

U.S. PATENT DOCUMENTS

| 3,676,719 | A | * | 7/1972 | Pecci | 310/24 |
|---|---|---|---|---|---|
| 3,782,107 | A | | 1/1974 | Bendall | |
| 3,872,840 | A | | 3/1975 | Adragna | |
| 3,878,412 | A | * | 4/1975 | Kurpanek | 310/24 |
| 3,952,709 | A | | 4/1976 | Riddle | |
| 4,012,675 | A | * | 3/1977 | Schulze, Jr. | 318/37 |
| 4,129,040 | A | | 12/1978 | Hayden, Jr. | |
| 4,368,396 | A | * | 1/1983 | Humphrey | 310/27 |
| 4,570,604 | A | | 2/1986 | Thornton et al. | |
| 4,596,219 | A | | 6/1986 | Kemmner | |
| 4,631,455 | A | * | 12/1986 | Taishoff | 318/37 |
| 4,749,893 | A | * | 6/1988 | Reynolds | 310/24 |
| 5,078,167 | A | | 1/1992 | Brandt et al. | |
| 5,219,034 | A | * | 6/1993 | Wortham | 180/65.31 |
| 5,457,349 | A | * | 10/1995 | Gifford | 310/24 |
| 5,469,004 | A | * | 11/1995 | Jachim | 310/24 |
| 5,714,829 | A | | 2/1998 | Guruprasad | |
| 5,833,440 | A | * | 11/1998 | Berling | 417/418 |
| 7,025,036 | B2 | | 4/2006 | Lampard | |
| 7,105,958 | B1 | | 9/2006 | Elmaleh | |
| 7,128,045 | B2 | | 10/2006 | Roelofs | |
| 7,157,996 | B2 | | 1/2007 | Enomoto et al. | |
| 7,163,003 | B2 | | 1/2007 | Bradford | |

* cited by examiner

Primary Examiner—Thanh Lam

(57) ABSTRACT

The present invention relates to the "Magnetic pistons engine", hereafter called "Maps engine" or "RAT engine" or "engine" that works on the principle of magnetism. It can be used to perform various tasks and functions that involve application of force or displacement of objects. This method provides an environmental friendly, very high efficiency engine that can complement or replace any engines that use fossil fuel, bio-fuel, solar power, wind power, hydro power, electricity, stored energy, or other energy sources.

3 Claims, 17 Drawing Sheets

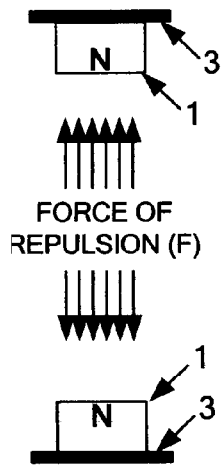
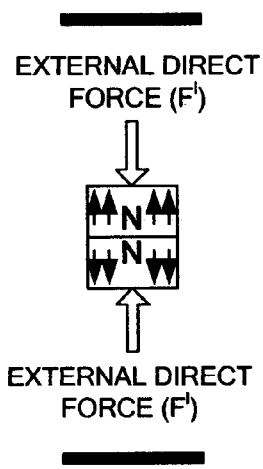
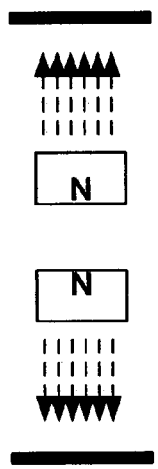
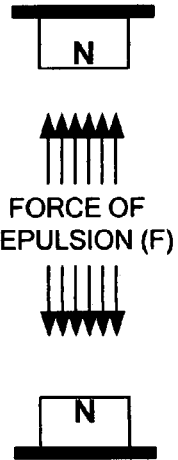
FIG. 5   FIG. 6   FIG. 7   FIG. 8
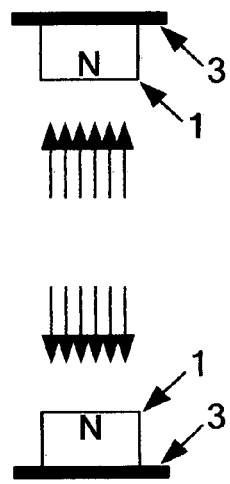
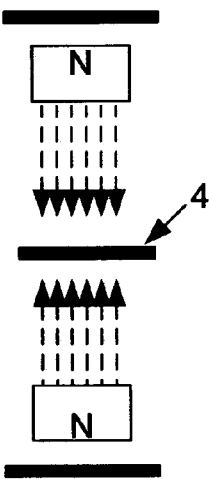
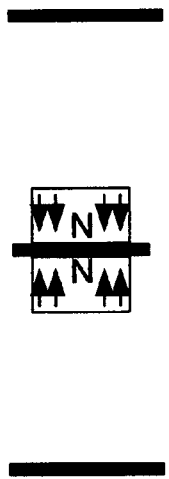
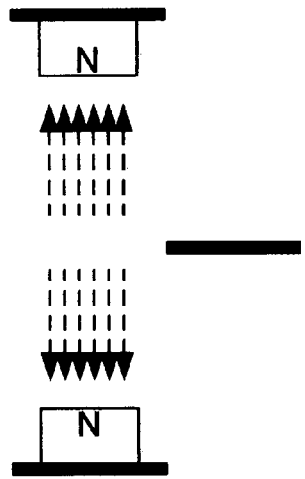
FIG. 9   FIG. 10   FIG. 11   FIG. 12

(T= Time taken for each revolution of the crankshaft 8)

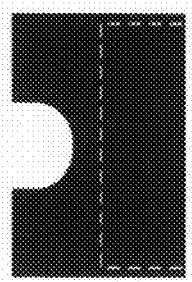
FIG. 30
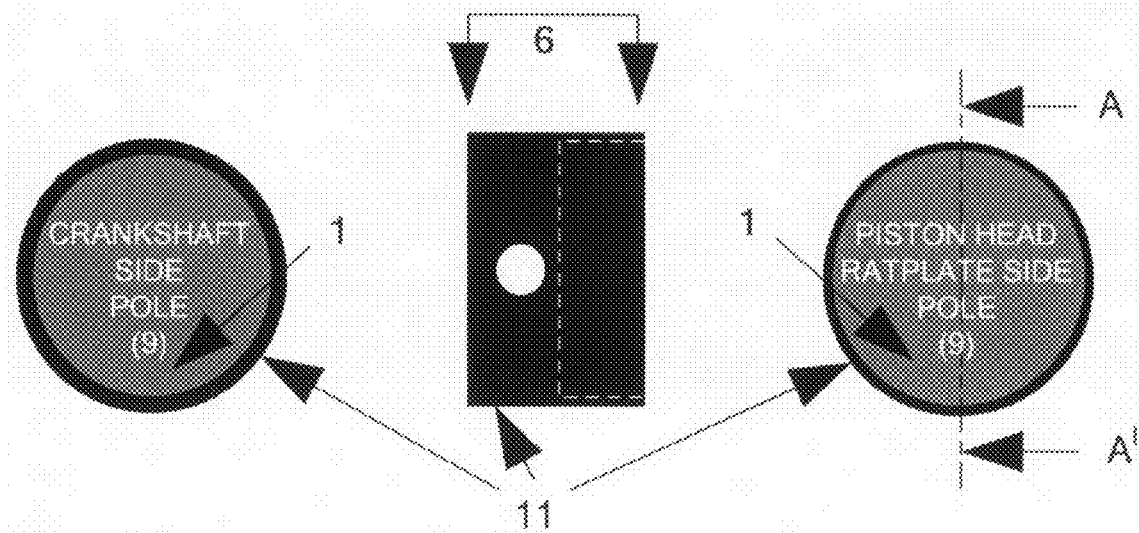
FIG. 31      FIG. 32      FIG. 33
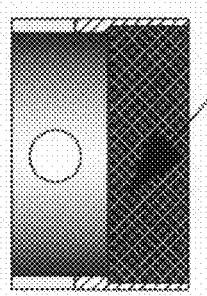   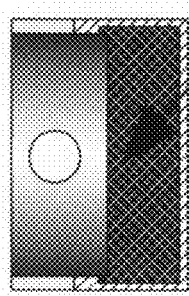
FIG. 34      FIG. 35

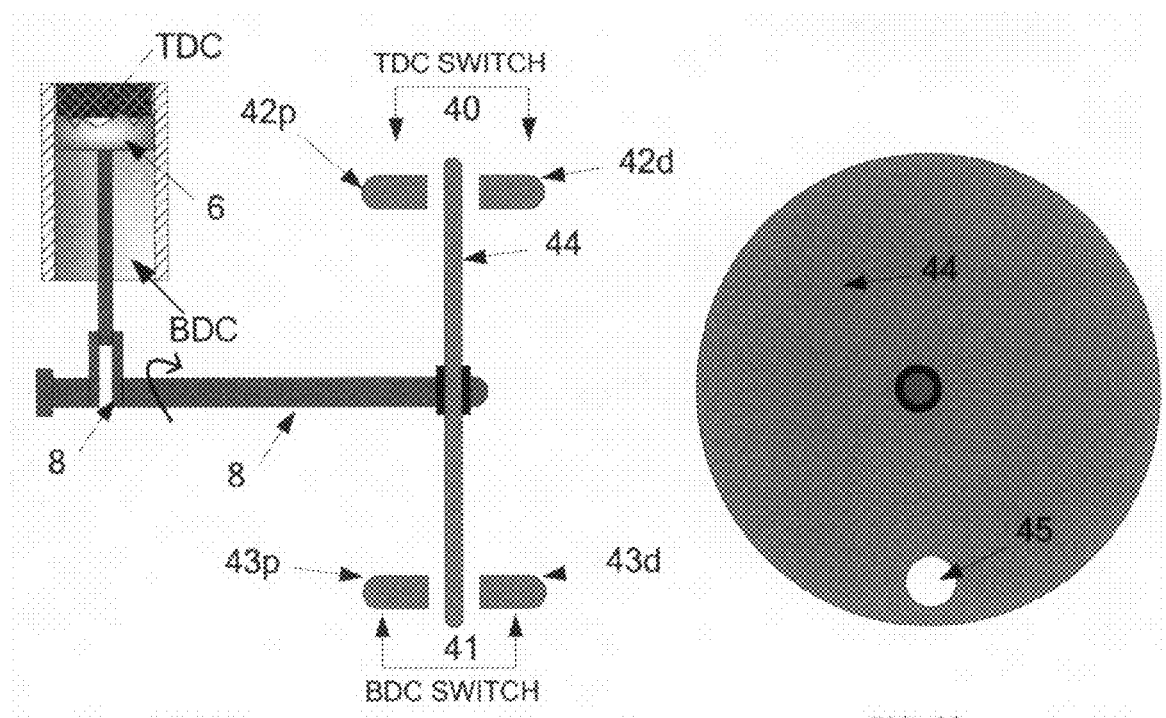
FIG. 54
FIG. 55
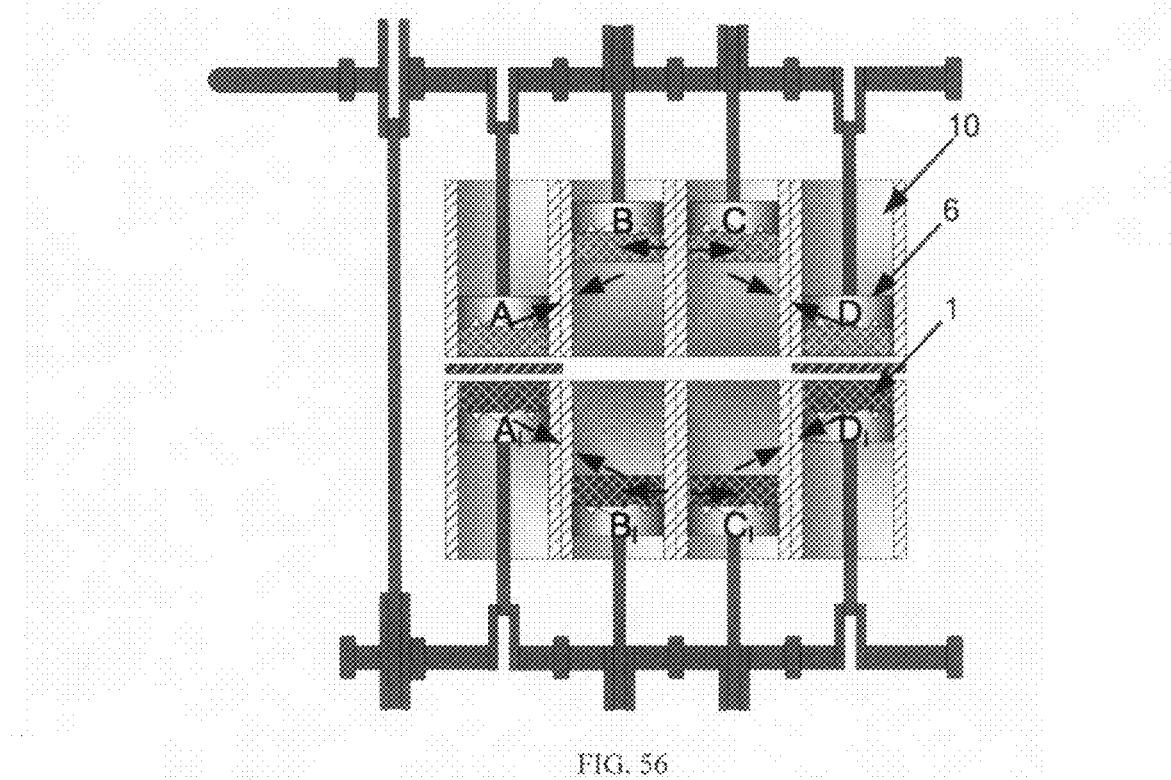
FIG. 56

MAGNETIC PISTONS ENGINE

CROSS-REFERENCE TO RELATED APPLICATION

This application claims the benefit of U.S. provisional patent application Ser. No. 60/813,259 filed Jun. 12, 2006.

FIELD OF THE INVENTION

The present invention relates to the "Magnetic pistons engine", hereafter called "Maps engine" or "RAT engine" or "engine" that works on the principle of magnetism. It can be used to perform various tasks and functions that involve application of force or displacement of objects. This method provides an environmental friendly, very high efficiency engine that can complement or replace any engines that use fossil fuel, bio-fuel, solar power, wind power, hydro power, electricity, stored energy, or other energy sources.

BACKGROUND OF THE INVENTION

Generating linear or circular motion power using different technologies is known for centuries. There are many types of engines to accomplish this. Internal Combustion engines and Steam engines are few examples of linear reciprocating engines. While Internal Combustion engines mainly use fossil fuel steam engines use hydro power. In all such engines, the reciprocating motion generated by the linear movement of one or more pistons is converted to the circular motion with the help of a crankshaft assembly. The engine is generally integrated within the main product (or machine) and serves as the heart of the equipment. Such an engine can be used as an automobile engine, aircraft engine, locomotive engine, ship engine, power generator engine, etc.

With the diminishing fossil fuel resources and unabated increase in energy costs and environmental concerns, engines using alternate energy sources such as bio-fuel, solar power, wind power, electric power, stored power, etc. are being developed around the world. However, such engines have many limitations. Production of bio-fuel takes enormous resources and they still pollute the environment. They do not meet the ever increasing energy demand as well. Engines that use storage power sources like batteries or compressed air have energy density issues. Similarly, the solar power is not efficient. Added to all, the initial capital and subsequent maintenance costs for machines that use alternate energy sources are very high. Further, the electricity that is used to charge the batteries or to refill the compressed-air tank may be produced from a thermal power plant that is again a concern for environmental pollution. Hence, in the absence of a viable alternative, until now, switching to new technology by changing from traditional Internal Combustion engines has been a challenge.

BRIEF DESCRIPTION AND SUMMARY OF THE INVENTION

The invention of Magnetic pistons engine, also called Maps engine, RAT engine, or engine, shown in FIG. 1, generally relates to the reciprocating engine based on linear, back-and-forth movement of the pistons and the improvements thereto. The uniqueness of this invention comes from the fact that Maps engine can be effectively integrated with equipments and machines that need engine to perform various tasks and functions. It can work as an automobile engine, aircraft engine, locomotive engine, ship engine, lawn mover engine, etc. depending on the requirement. In general, it can complement or replace existing engines that use fossil fuel, bio-fuel, electric power, solar power, wind power or stored power, etc. Further, it can also be used to drive the power generators to produce the electricity. The use of Maps engine is limitless when the application area is considered.

Unlike Steam engines and Internal Combustion engines, Maps engine is environmentally very safe since it does not burn any fuel. Due to the rising fuel costs, environmental issues and diminishing natural fuel reserves, Maps engine can become a viable alternative to many existing engines.

Further, due to the principle of its operation, Maps engine uses very low power (small force) to generate very high power (large force). Hence, Maps engine works at very high efficiency with the possibility of reaching unity-over operation mode.

BRIEF DESCRIPTION OF THE DRAWINGS

FIG. 5 shows the principle of force of repulsion between the like poles of two permanent magnets.

FIG. 6 shows two permanent magnets, whose like poles are facing each other, brought near each other with the application of external direct forces.

FIG. 7 shows two permanent magnets, whose like poles are facing each other, being repelled the moment the external applied forces are removed.

FIG. 8 shows the repelling magnets stopped by the stoppers located at extreme ends while the magnets are still within each others magnetic field.

FIG. 9 shows the repelling magnets stopped by the stoppers located at extreme ends while the magnets are still within each others magnetic field.

FIG. 10 shows the two permanent magnets, whose like poles are facing each other, being attracted by a ferromagnetic plate (sheet) such as iron placed in between them.

FIG. 11 shows the two permanent magnets, whose like poles are facing each other, attracted to the ferromagnetic plate (sheet) such as iron when placed in between them.

FIG. 12 shows the two repelling magnets stopped by their stoppers after they are repelled due to the removal of ferromagnetic plate, while the magnets are still within each others magnetic field.

FIG. 30 shows the top plan view of the magnetic piston shown in FIG. 32.

FIG. 31 shows the left side (crankshaft side) elevation view of the magnetic piston shown in FIG. 32.

FIG. 32 shows the front elevation view of a typical magnetic piston used in Magnetic pistons engine.

FIG. 33 shows the right side (Rat plate side) elevation view, which is also the piston head's view, of the magnetic piston shown in FIG. 32. Note that the thin non-magnetic protection layer that protects the piston head is not shown in the figure.

FIG. 34 shows the cross sectional view of magnetic piston (without thin, non-magnetic protective layer that covers the piston head) shown in FIG. 32 as seen from $AA'$.

FIG. 35 shows the cross sectional view of magnetic piston shown in FIG. 32, with the piston head covered by thin, non-magnetic protective layer of sufficient thickness (identified by arrow 21).

FIG. 40*a* shows the top plan view of RAT plate shown in FIG. 40.

FIG. 54 shows optical-switch operated TDC/BDC position detection and pulse generation system.

FIG. 55 shows typical wheel that is used in optical-switch operated TDC/BDC position detection and pulse generation system shown in FIG. 54.

FIG. 56 shows the staggered multi-cylinder Magnetic pistons engine.

DETAILED DESCRIPTION AND THE BEST MODE OF THE INVENTION

Before we turn our attention to the detailed operation of environmental friendly, highly efficient Maps engine, let us understand the basic principle of magnetism on which Maps engine has been invented. A little knowledge on magnetism and magnetic materials is desirable but not necessary to understand the concept of this invention.

5.1 Principle of Magnetism

Figure 2:
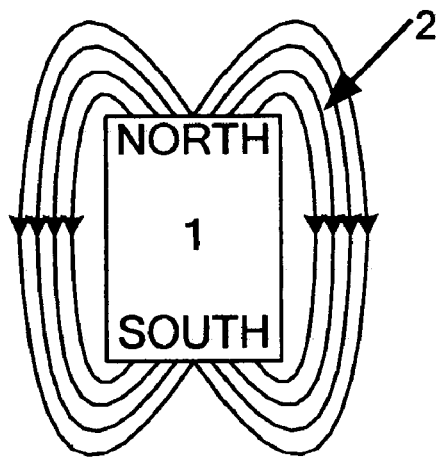
FIG. 2 shows a cylindrical shaped permanent magnet with its imaginary flux lines leaving-out from the north pole and entering-in from the south pole.

FIG. 2 shows a permanent magnet 1. A permanent magnet 1, also called magnet 1, is a piece of material that has equal number of poles. A pole can be described as the point where all the lines 2 of magnetic force meet. A magnet 1 will have at-least two poles, one is North and the other is South. The lines 2 of the magnetic field, also called the flux lines 2, turn around the magnet 1 in all directions, leaving out from the North pole and entering in from the South pole.

Note that the flux lines 2 in FIG. 2 are imaginary lines 2 shown only for the purpose of explanation. The extension of the flux lines 2 over the distance around the magnet 1 helps in identifying the strength of the magnet 1. Both North and South poles of the magnet 1 strongly attract and magnetize all ferromagnetic materials. Iron, nickel, cobalt, and gadolinium are few examples of ferromagnetic materials that strongly respond to a magnetic field.

Figures 3, 4:
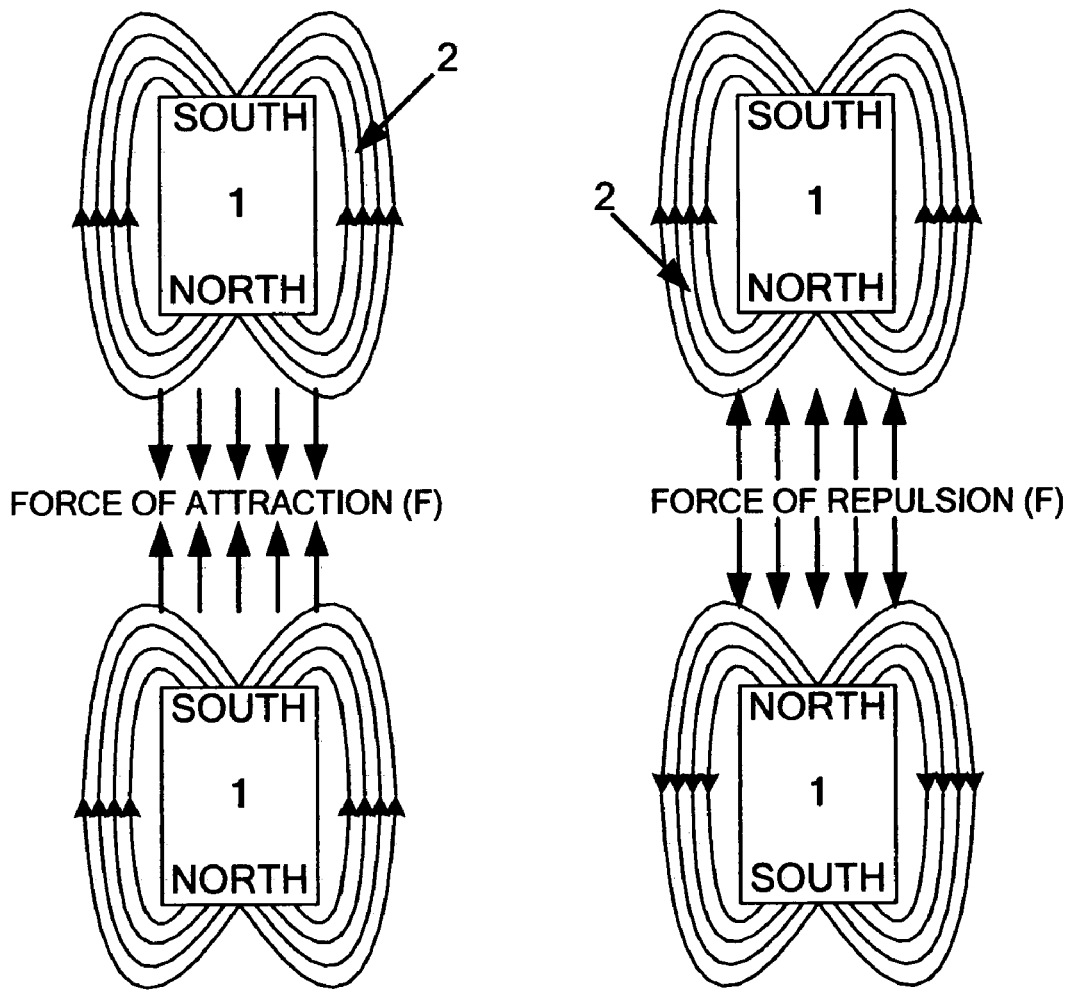
FIG. 3 shows the principle of force of attraction between the unlike poles of two permanent magnets.
FIG. 4 shows the principle of force of repulsion between the like poles of two permanent magnets.

Refer to FIGS. 3-4. Two magnets 1 attract when their unlike poles (North-South) are brought near each other. Similarly, they repel when their like poles (North-North or South-South) are brought near each other. The force of attraction or repulsion between two magnets 1 depends on the shape, magnetization, orientation and separation of the magnets 1.

For the simple case, Newton's third law shows that the mutual force of attraction or repulsion (F) between the two magnets 1 is directly proportional to the product of their magnetic pole strengths (m1, m2) and inversely proportional to the square of the distance (r) between them. Expressed mathematically, Force of attraction or repulsion between two magnets 1 is given by, $F=(m1*m2)/\mu r^2$ where, F is force, expressed in Newton m1 and m2 are the pole strengths of the magnets 1, expressed in Weber $\mu$ is the permeability of the intervening medium, expressed in Telsa-meter/ampere r is the separation between the two magnets 1, expressed in meter Note: All values are in SI units.

Above equation shows that the strength of a magnetic field drops off roughly exponentially over distance.

5.2 Magnetic Repulsion of Like Poles

FIG. 5 shows two cylindrical magnets 1 with their like poles facing each other but held from going beyond the non-magnetic (such as wood or plastic) stoppers 3 such that the magnets 1 are within each others magnetic field. Both magnets 1 can be brought near each other, as shown in FIG. 6, with the application of external direct forces on them that is opposite and greater than the combined magnetic repulsion force exerted by both the magnets 1. The repulsion force generated by the magnets 1 increase exponentially as the spacing between them reduces. The repulsion force between the magnets 1 will be so strong that the magnets 1 instantly move away (if they are not allowed to face their unlike poles) from each other the moment the external forces on both magnets 1 are removed as shown in FIGS. 7. Eventually, both repelling magnets 1 stop near the stoppers 3 as shown in FIG. 8.

Considering the two magnets 1 are identical in their characteristics (though there can be some differences in actual magnets 1 of the same size and materials), the two magnets 1 repel each other with equal and opposite forces. If the combined repelling force exerted by both the magnets is F, then the combined external applied force $F^I$ must be greater than F and in opposite direction to overcome the repulsion force to bring the magnets 1 closer to each other.

Expressed mathematically, $F^I \geq -F$

While it is possible to extract the energy from the two repelling magnets 1 in this way, notice that the energy does not come for free. The two repelling magnets 1 have to be brought together by applying external direct forces before we can allow them to repel and get the energy back. That means, the energy really comes from the applied external direct forces and the magnets 1 just act as energy storage mechanisms. In other words, the energy spent by the application of external forces to bring the like poles closer only gets used up when the magnetic like poles repel from each other. Hence, this process does not produce excess energy than the applied energy since the net energy generated is always zero. Therefore, generating energy by the application of direct external force on the magnet(s) is not useful.

5.3 Baxic Principal of Magnetic Pistons

FIG. 9 shows two cylindrical magnets 1 with their like poles repelling each other but held by the non-magnetic stoppers 3 such that the magnets 1 are within each others magnetic field.

When a ferromagnetic Plate 4 (also called ferromagnetic sheet 4, iron plate 4, or iron sheet 4) such as iron of sufficient thickness is inserted in between the like poles as in FIG. 10, the iron sheet 4 forms a strong barrier between the like poles. The barrier arrests any direct magnetic flux linkage between the poles. Since the magnetic fields of both repelling like poles are ideally isolated from each other, they do not repel each other. This results in both magnets 1 strongly attracting the iron sheet 4 present in between them. Now, if the iron sheet 4 is held in its place, then the magnets 1 themself come instantly towards their respective side of the iron sheet 4 and form a strong bond with the iron sheet 4 as shown in FIG. 11. Thus, the application of small force to bring the iron sheet 4 in between the like poles results in the attraction of large magnets 1 thereby generating a force that is higher than the applied force.

Now, if the iron plate 4 that is in between the magnets 1 is pulled-out while the magnets 1 are still held in their places, the like poles of the magnets 1 again start directly facing each other. The removal of the iron plate 4 sets up an instantaneous and strong repulsion force between the like poles. As the magnets 1 instantly move away from each other due to increasing repulsion, the distance between the magnets 1 and the iron sheet 4 also increases, thereby reducing the attraction force between the magnets 1 and the iron sheet 4. Eventually, the magnets 1 come to rest near their respective stoppers 3 while they are still within each others magnetic field (FIG. 12). Thus, the application of initial minimum force to remove the iron plate 4 from in-between the like poles result in a sustained chain reaction of increasing repulsion between the magnets 1 and reducing attraction between the magnet and the iron sheet 4.

The above principle shows that the insertion and removal of a ferromagnetic sheet 4 in between the like poles of the large magnets 1 by the application of a small force results in the linear, back-and-forth movement of the magnets 1 thereby generating a large force during each movement.

Let us extend the above principle this time by operating the magnets 1 within their respective non-magnetic cylindrical enclosures 5. Refer to FIGS. 13-18. The enclosures 5 help in easy movement of the magnets 1 without diverting them. The closed end of the enclosure helps in stopping the magnet 1 from going beyond the enclosure.

Figure 13:
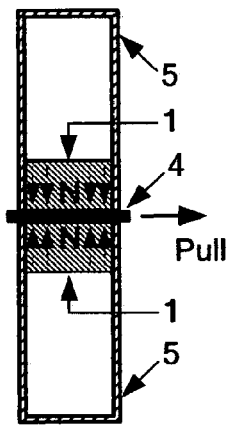
FIG. 13 shows the cross sectional view of two cylindrical magnets inside their respective non-magnetic (metallic or non-metallic) cylinders, whose like poles are facing each other, attracted to the ferromagnetic plate placed in between them.
Figure 14:
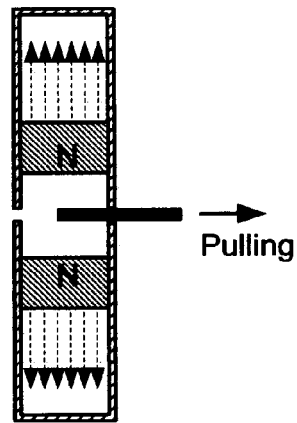
FIG. 14 shows the cross sectional view of two repelling magnets moving away from each other inside their respective non-magnetic cylinders while the ferromagnetic plate that was placed in between them is being removed.
Figure 15:
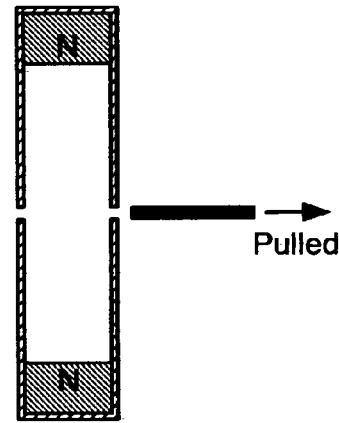
FIG. 15 shows the cross sectional view of two repelling magnets stopped at the end of their respective non-magnetic cylinders due to the removal of ferromagnetic plate while the magnets are still within each others magnetic field.

FIG. 13 shows the cross-sectional view of two cylindrical magnets 1 held by the iron plate 4 of sufficient thickness that is kept ready for mutual repulsion. The two magnets 1 are allowed to repel from each other within their respective non-magnetic (metallic or non-metallic) enclosures 5 by the removal of the iron plate 4 as shown in FIG. 14. While the iron plate 4 (or iron sheet 4) is being removed, the repulsion force between the magnets 1 increases and the attraction force between the magnets 1 and the iron plate 4 reduces. The chain reaction of increasing repulsion between the magnets 1 and reducing attraction between the magnet 1 and the iron plate 4 instantly moves the magnets 1 to their extreme ends (FIG. 15).

Figure 16:
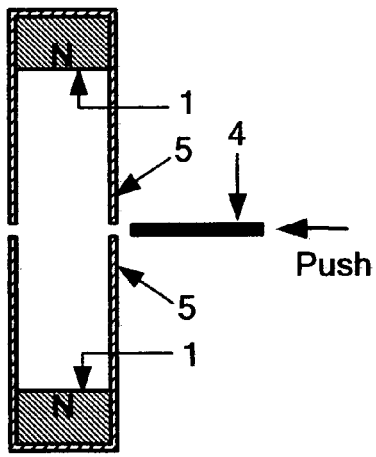
FIG. 16 shows the cross sectional view of two repelling magnets, resting at their respective end of their non-magnetic cylinder, ready for attraction when the ferromagnetic plate is pushed in between them.
Figure 17:
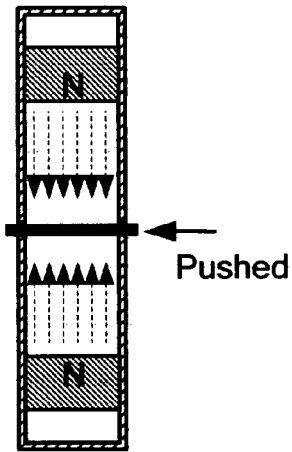
FIG. 17 shows the cross sectional view of two repelling magnets that were resting at their respective end of their non-magnetic cylinder, being attracted by a ferromagnetic plate placed in between them.
Figure 18:
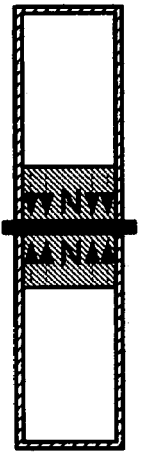
FIG. 18 shows the cross sectional view of two repelling magnets in their respective non-magnetic attracted to the ferromagnetic sheet placed in between them inside the cylinder.

The instantaneous reinsertion of the iron plate 4 in between the magnets 1, as shown in FIG. 16, generates a strong attraction force between the magnet 1 and the iron sheet 4 (FIG. 17). This causes both magnets 1 to instantly move towards the iron sheet 4 with exponentially increasing attraction force. Hence, the magnets quickly latch on to their respective side of the iron sheet as shown in FIG. 18.

The above process confirms that the continuous insertion and removal of the iron sheet 4 in between the like poles of the magnets 1 creates a continuous, linear (back-and-forth) movement of both the magnets 1 within their respective non-magnetic cylinders 10. The speed and the force with which the back-and-forth movement of the magnets 1 occur are directly proportional to the speed with which the ferromagnetic sheet 4 is pulled-out from or pushed-in between the magnets 1. This process generates a linear back-and-forth movement if the magnets 1 are made to work as pistons 6. Further, with the help of the piston rod and the crank shaft mechanism, the linear reciprocating movement of the magnetic pistons 6 can be converted to circular motion.

This above operation also confirms that the application of a small force to remove the iron plate 4 from in-between the like poles of the magnets 1 results in a very high repulsion force between the magnets 1. Similarly, the force required to insert the iron plate 4 in-between the like poles of the magnets 1 to bring them closer to the iron sheet 4 is negligible. In essence, the force required to move the magnets 1 back-and-forth indirectly by operating an iron sheet 4 between their like poles is much less than the force required for moving the magnets 1 directly in the absence of the iron sheet 4 in between the poles. This principle can be applied to develop a very high efficiency engine with the possibility of reaching unity-over mode.

Important note: It must be noted that the iron plate 4, when inserted, will always be exactly in between the like poles of two identical magnets 1, having similar characteristics. With this the magnetic attraction forces exerted by the magnets 1 on the iron plate 4 are equal and opposite and the net force exerted is zero. Also, the magnets 1 almost touch the iron sheet 4 when they are fully attracted but no physical contact exists between the magnets 1 and the iron sheet 4 at all times. The equidistance of both the magnets 1 from the iron plate 4 and the micro-gap between the magnet 1 and the iron plate 4 helps in tremendous reduction of friction between the magnet 1 and the iron plate 4. It also reduces the force required to operate the iron plate 4. This process of operating the magnets 1 results in extremely high efficiency.

5.4 Basic Principle of Magnetic Pistons Engine

This section explains the basic principle of linear reciprocating Magnetic pistons engine that has been invented based on the magnetic repulsion principle explained in previous sections. For efficient operation, Maps engine must always have the pistons 6, also called magnetic pistons 6, having similar characteristics, in multiples of two and their like poles directly facing each other (when the iron plate 4 is pulled out from in-between the like poles). At least a pair of pistons 6 is required for the satisfactory operation of Maps engine.

Figure 19:
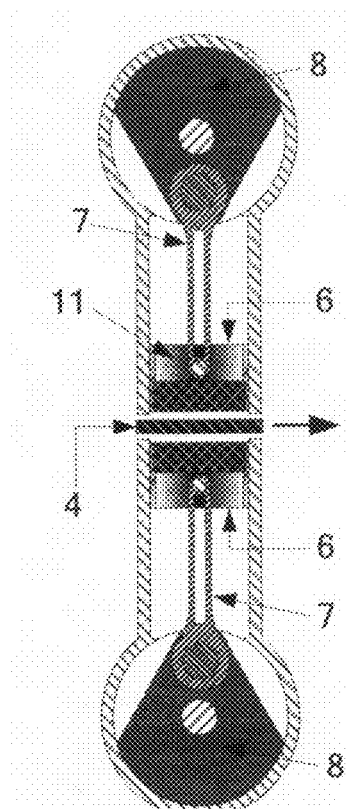
FIG. 19 shows the cross sectional view of the basic Magnetic pistons engine with both the opposing pistons ready for repulsion from their Top Dead Centers when the iron plate placed in between them is pulled out.
Figure 20:
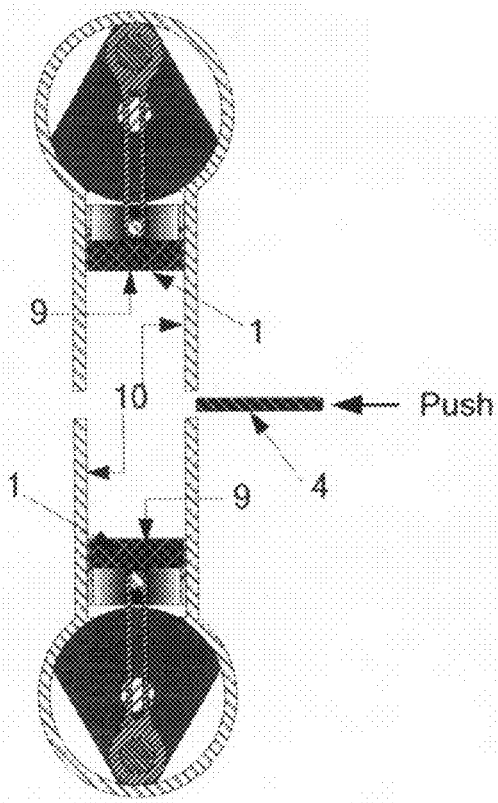
FIG. 20 shows the cross sectional view of the basic Magnetic pistons engine with both the opposing pistons ready for attraction from their Bottom Dead Centers when the iron plate is pushed in between them.

FIG. 19-20 shows the cross sectional view of the basic Magnetic pistons engine with their magnetic pistons 6 at extreme ends. At its minimum, Maps engine has a pair of Magnetic pistons 6, their associated connecting rod 7 and the crankshaft 8 assembly. The core of the magnetic piston 6 consists of a permanent magnet 1. The exposed, flat surface of the piston 6 that is nearer to the ferromagnetic plate 4 is called the magnetic piston head 9, magnetic head 9, or piston head 9. All piston heads 9 in a Maps engine must have only magnetic like poles (North or South, but not both) always directly facing each other (in the absence of the RAT plate 4). The piston rod 7 connected in between the piston 6 and the crankshaft 8 accommodates for the confined linear reciprocating movement of the piston 6 within its cylinder 10. It also helps in converting the linear reciprocating motion of pistons 6 to the circular motion with the help of the crankshaft 8 assembly.

Unlike pistons in other engines, the magnetic pistons 6 in Maps engine have special requirements. The piston 6 in Maps engine consists of a hollow casing 11 made up of high strength non-magnetic materials such as stainless steel, titanium or similar materials of high resistivity and low electrical conductivity. Alternatively, piston casing 11 can also be made up of non-metallic, thermal resistant materials as well or can be made by integrating both non-magnetic and non-metallic materials. Inside the casing 11 of each piston 6 is fitted with a powerful cylindrical shaped permanent magnet 1 made of neodymium-iron-boron (NdFeB), samarium-cobalt (SmCo) or similar high magnetic strength materials. The casing 11 helps in avoiding the direct mechanical friction between the magnet 1 and the cylinder 10 during the linear reciprocating motion of the piston 6 within the cylinder 10. The cylinder 10 is also made up of high strength non-magnetic stainless steel, titanium or similar materials of high resistivity and low electrical conductivity. Alternatively, the cylinder 10 can be made up of non-metallic, thermal resistant materials as well or can be made by integrating both non-magnetic and non-metallic materials. Further, the non-magnetic metallic cylinder 10 can also have small slots around it to minimize eddy currents due to magnetic piston's movement within the cylinder 10.

Placed in between the pair of the magnetic heads 9 is a ferromagnetic plate 4 (or sheet 4) of sufficient thickness made up of iron, nickel, cobalt or similar high permeability ferromagnetic materials that can be easily attracted by the permanent magnetic heads 9. The ferromagnetic plate 4 helps in attracting the pistons 6 when the iron plate 4 is in between the magnetic heads 9.

It also helps in initiating a strong repulsion force between the pair of magnetic piston heads 9 (like poles) when the iron plate 4 that is in-between the magnetic like pole heads 9 is pulled-out. While the iron plate 4 moves back-and-forth in the direction perpendicular to the pistons 6 movement, the pistons 6 move linearly, back-and-forth within their respective cylinder 10. Also, the iron plate 4 stays exactly in between the like poles of two piston heads 9 when inserted. Further, the piston heads 9 almost touch the iron plate 4 when they are fully attracted by the iron plate 4 but no physical contact exists between the magnetic head 9 and the iron plate 4 at all times. This ensures no friction between the magnetic heads 9 and the iron plate 4 during the back-and-forth movement of iron plate 4 and the pistons 6.

Since the ferromagnetic plate 4 generates the Repulsion and Attraction of the magnetic heads 9 and the subsequent linear reciprocating movement of pistons 6, the ferromagnetic plate 4 is often referred to as the "Repulsion-Attraction plate" or "RAT plate".

Figure 21:
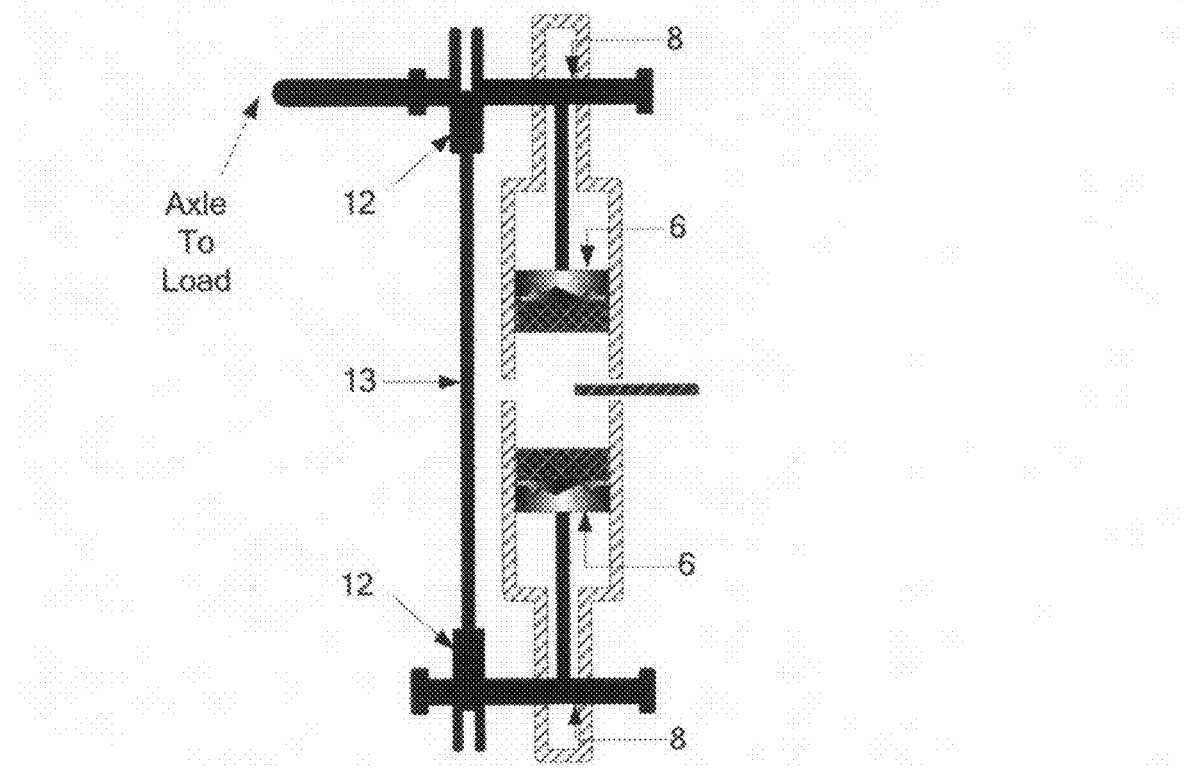
FIG. 21 shows a general view of the basic Magnetic pistons engine with both the flywheels coupled by a common flywheel rod.

In order to operate the engine effectively, the pistons 6 movement and hence their timing with the RAT plate 4 movement must be synchronized. FIG. 21 shows one way of achieving this. Each crankshaft 8 in a Magnetic pistons engine must be fitted with a flywheel 12. Further, the flywheels 12 are coupled by a common flywheel rod 13. The flywheel rod 13 helps in synchronizing the pistons 6 movement such that the opposing pistons 6 will be at equidistance from the RAT plate 4 at all times. The flywheel rod 13 also helps in effectively managing the combined rotational force generated by both the crankshafts 8 (flywheels 12). In addition to regulating the circular motion of the crankshaft 8, the flywheel 12 also stores the excess energy generated by the pistons 6 during the repulsion stroke for subsequent use.

5.5 Magnetic Pistons Operation Cycle

The principle of operation of Maps engine can be better understood with the help of the engine's operation cycle. FIGS. 22-27 show Maps engine with the magnetic heads 9 at different positions during the operation cycle. Notice that both the pistons 6 are always at equidistant from the RAT plate 4 within their non-magnetic cylinder 10 during the pistons 6 operation. The piston 6 can be in any position within the cylinder 10 during the initial turn-ON of the engine. The position of the piston 6 in which it is farthest from the crankshaft 8 is called the Top Dead Center (TDC) or RAT plate End (RPE). Similarly, the position of the piston 6 in which it is closest to the crankshaft 8 is called the Bottom Dead Center (BDC) or Crankshaft End (CSE).

Figure 22:
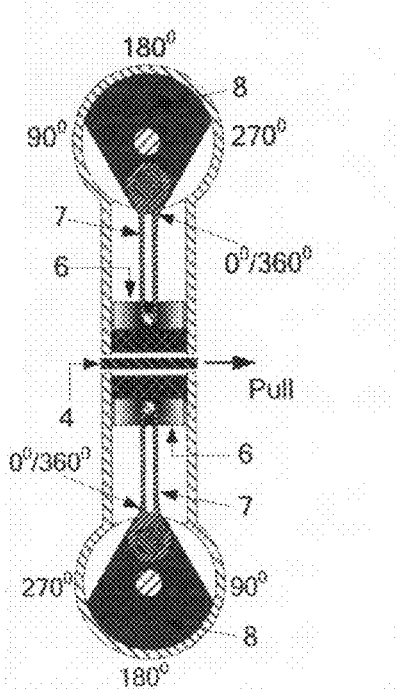
FIG. 22 shows the cross sectional view of the basic Magnetic pistons engine, with both the opposing pistons at Top Dead Centers, ready for repulsion stroke when the ferromagnetic (iron) plate placed in between them is pulled out.
Figure 23:
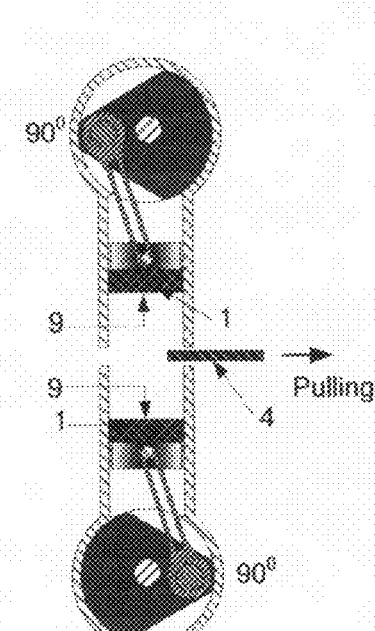
FIG. 23 shows the cross sectional view of the basic Magnetic pistons engine with both the opposing pistons being repelled during the repulsion stroke while the iron plate placed in between them is being removed.
Figure 24:
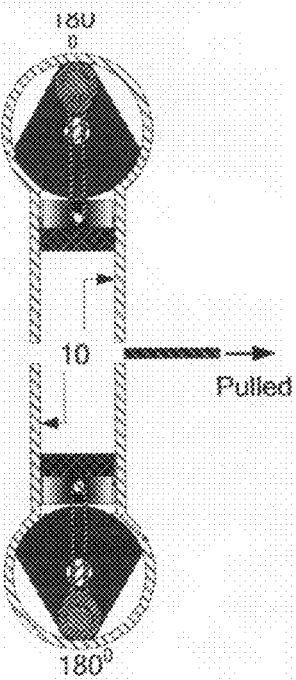
FIG. 24 shows the cross sectional view of the basic Magnetic pistons engine, with both the opposing pistons at their Bottom Dead Centers when they are fully repelled due to the removal of iron plate placed in between them.
Figure 25:
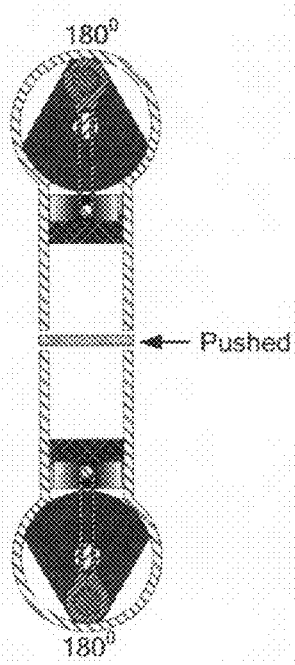
FIG. 25 shows the cross sectional view of the basic Magnetic pistons engine with both the opposing pistons at Bottom Dead Centers at the beginning of the attraction stroke after the iron plate is pushed in between them.
Figure 26:
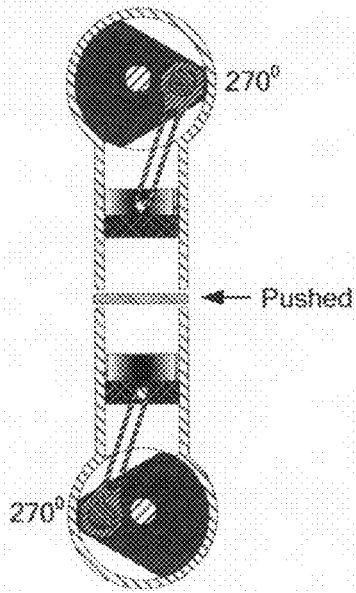
FIG. 26 shows the cross sectional view of the basic Magnetic pistons engine with both the opposing pistons moving towards their Top Dead Centers when the iron plate is pushed in-between them during the attraction stroke.
Figure 27:
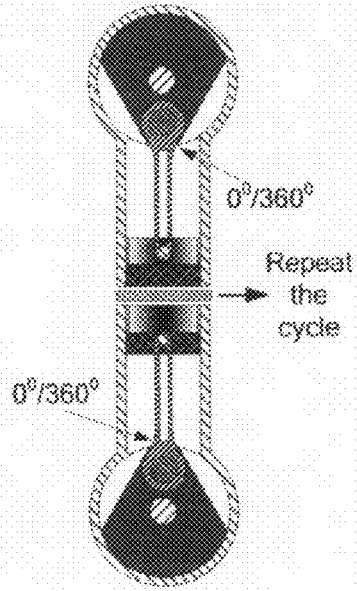
FIG. 27 shows the cross sectional view of the basic Magnetic pistons engine with both the opposing pistons ready for the next RAT (repulsion-attraction) cycle.

FIG. 22 shows the engine with both the pistons at TDC due to the attraction by the RAT plate 4 present in between the like poles heads 9. When the RAT plate 4 is pulled-out from in-between the pistons 6 as shown in FIG. 23, it quickly sets up a strong repulsion force between the piston heads 9 whose like poles always opposes each other. This sets up the repulsion stroke that causes the pistons 6 to quickly move away from each other within their respective cylinders 10. The linear backward movement of pistons 6 from the RAT plate 4 creates an angular movement of the crankshaft 8, as shown in FIGS. 22-24 at every 90° interval during the repulsion stroke. When both the opposing pistons 6 move to 180° (BDC) point as in FIG. 24, the RAT plate 4 is inserted in-between the like pole heads 9 as shown in FIG. 25. The excess energy stored in the flywheel 12 from the previous repulsion stroke aided by the attraction of the magnetic heads 9 by the RAT plate 4 causes both the pistons 6 to move towards the RAT plate 4 (FIG. 26). This forms the attraction stroke during the second half of the angular movement of the crankshaft 8 completing the remaining 180°, thereby bringing the pistons 6 to TDC (360°) point as in FIG. 27. FIGS. 25-27 show the angular movement of the crankshaft 8 at every 90° interval during the attraction stroke. Thus, a complete 360° rotation of the crankshaft 8 is achieved for every push-pull operation cycle of the RAT plate 4. Since the first half of the cycle consists of the magnetic pistons 6 repulsion stroke while the second half consists of the magnetic pistons 6 attraction stroke, the complete operation cycle of the pistons 6 in Maps engine is called the "Repulsion-Attraction cycle", hereafter called the "RAT cycle". The speed and the force with which the back-and-forth movement of the magnetic pistons 6 occur are directly proportional to the speed with which the RAT plate 4 is pulled-out from or pushed in-between the magnetic heads 9.

5.6 Maps Engine With Closed Loop Control

Figure 28:
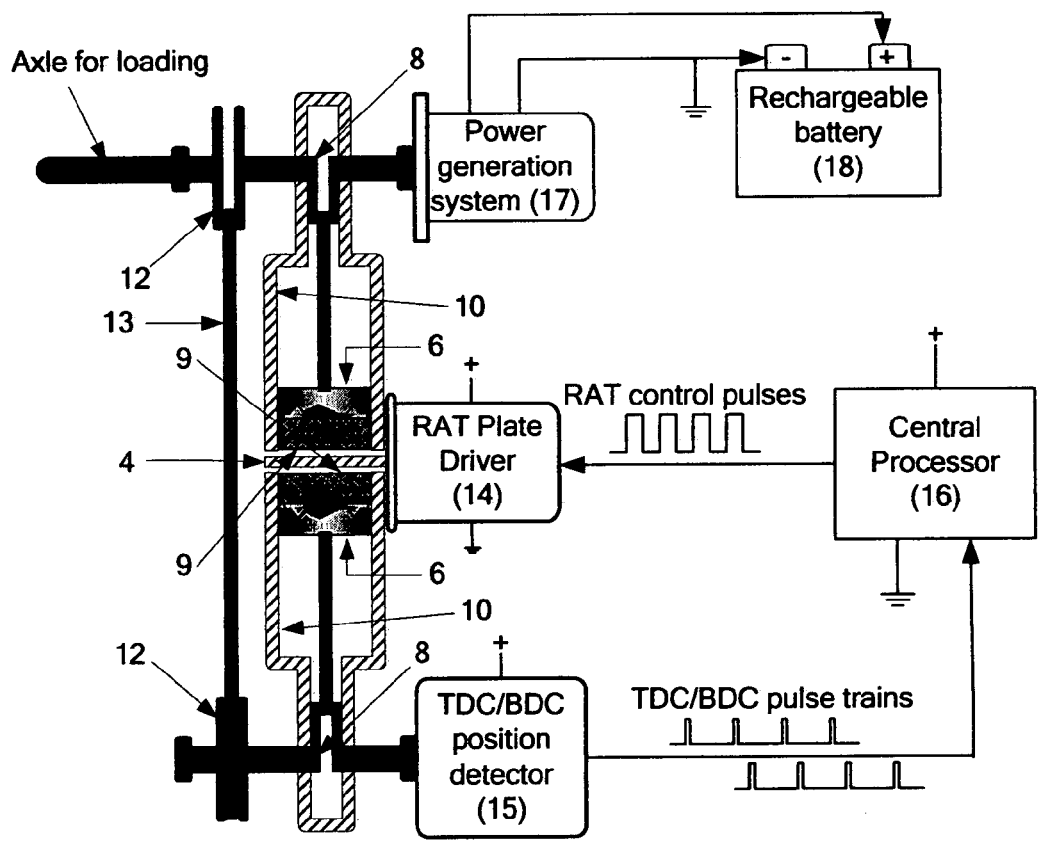
FIG. 28 is the reproduction of FIG. 1, which shows the basic configuration of Magnetic pistons engine with closed loop control.
Figure 29:
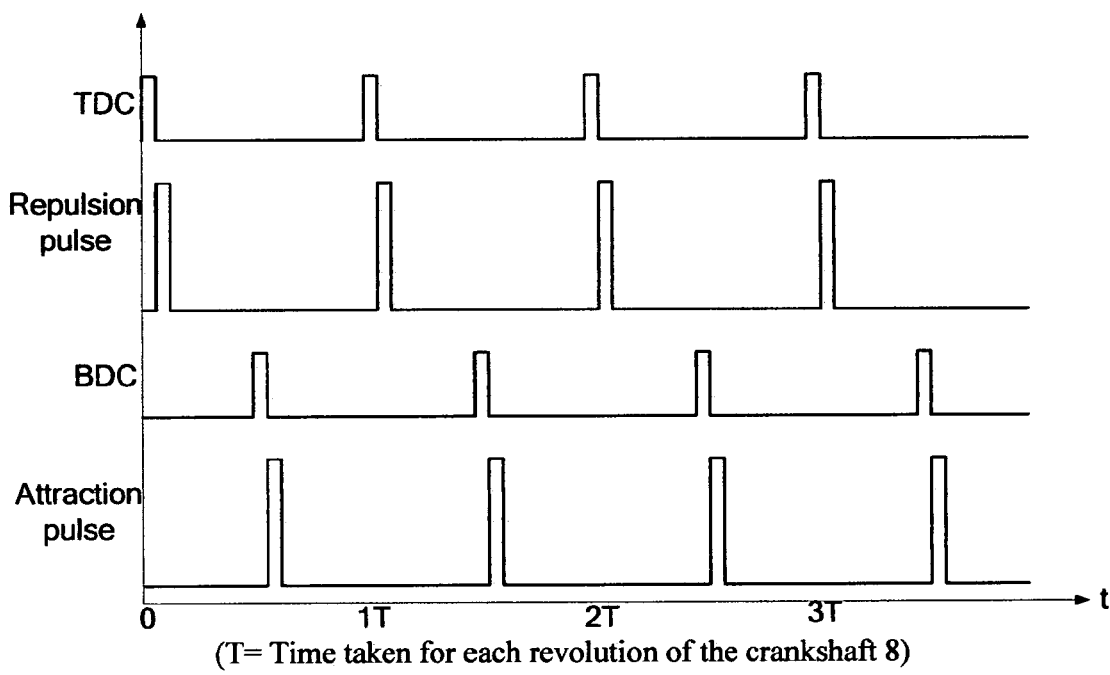
FIG. 29 shows the timing diagram of different events that occur during the operation of Maps engine.

FIG. 28 shows the basic, twin-cylinder (10) Magnetic pistons engine with closed loop control. FIG. 29 shows the timing diagram that represents different events that occur during a typical RAT cycle. Though the engine shown in FIG. 28 has only a pair of cylindrical pistons 6, it can be built with the pistons 6 of any desirable shape and size. A generalized version of Maps engine with other possible piston 6 shapes is explained in section 8.

Since Maps engine does not consists of any type of compression or expansion stroke as it does not use fuel, there is no need to crank the engine by any auxiliary means provided that the engine is not engaged with the load. The initial push-pull movement of RAT plate 4 for few cycles can build-up the momentum in the flywheels 12 and start the engine. However, in situations where high momentum is needed during initial start-up of the engine, auxiliary techniques such as motorized cranking, hand cranking, rope-pull cranking, etc. can be used.

Once the engine is started, the real-time feedback control loop takes over the control of the engine. The engine remains in the continuous operation state until it is stopped. However, provision exists to control the speed of the engine (Refer section 7 for details). The engine can be stopped at any time by turning OFF the control pulses (FIG. 29) to the RAT plate driver 14.

As mentioned earlier, the engine must have at-least one flywheel 12 connected to each crankshaft 8 that controls each side of the pistons 6. Further, the flywheels 12 must be coupled by a flywheel rod 13 to ensure the accurate and synchronized movement of pistons 6 and load balancing during the operation of the engine. The flywheel 12 connected to the crankshaft 8 helps in storing the energy generated during the repulsion stroke and generates the angular momentum while resisting the changes in rotation speed caused due to pistons' 6 uneven movement. The flywheel 12 also helps in reducing the pulsation characteristic during each stroke. Further, the coupling of flywheels 12 helps in maintaining the equidistance of pistons 6 from the RAT plate 4 and accurate detection and generation of the synchronized TDC/BDC control signals (pulses). The TDC/BDC control signals are used for the operation of the RAT plate 4 when the pistons 6 are at Top Dead Center (TDC)s and Bottom Dead Center (BDC)s.

The TDC/BDC position detector (block 15, FIG. 28) detects the piston's 6 position when they are at extreme ends (TDC or BDC) of the cylinder 10. All the pistons 6 reach the dead centers simultaneously. When all the pistons 6 reach, say TDC, the TDC/BDC detector 15 generates the corresponding TDC signal (pulse). Similarly, when all the pistons 6 simultaneously reach BDC, the corresponding BDC signal is generated. The generated signals are fed to the central processor 16 on real-time. The central processor 16 processes the signals and in turn generates the appropriate RAT control pulses (FIG. 29). When the TDC is detected, the repulsion control signal is fed to the RAT plate driver 14. The repulsion signal pulls-out the RAT plate 4 from in-between the piston heads 9 thereby creating the repulsion between the magnetic heads 9 whose like poles start directly facing each other when the RAT plate is being removed. Similarly when the pistons 6 are at the crankshaft end (BDC), the BDC signal is generated. The BDC signal is fed to the central processor 16 to generate the attraction control signal. The attraction signal pushes in the RAT plate 4 in-between the pistons heads 9 creating the attraction stroke. The excess energy stored in the flywheel 12 from the previous repulsion stroke aided by the RAT plate's 4 attraction causes the pistons 6 to move toward the RAT plate 4.

The Maps engine is normally fitted with an onboard rechargeable battery 18 or similar storage power source. The onboard power source is normally used to start the engine and provide uninterrupted power supply to the control electronics during the operation of the engine. The battery is charged by the onboard electric power generation system 17 during the operation of the engine.

6. Critical Components of Maps Engine

6.1 Magnetic Piston

The magnetic piston 6 (FIGS. 30-35) used in Maps engine is very much different than the pistons 6 used in traditional Internal Combustion engines and Steam engines. The Maps engine works purely on the principle of magnetic Repulsion and Attraction. Hence, the piston must be designed to accommodate for the required type of magnet 1 of sufficient strength. While this document mainly focuses on cylindrical shaped magnetic pistons 6, the shape of the piston 6 can vary depending on the size and type of the engine design. Rectangular, oval, ammunition magazine or any other shape piston 6 can also be used. Further, a large piston 6 having single large magnet 1 block (FIGS. 58-61) connected to several piston rods 7 is another choice for large engines. Refer section 8 for more details.

FIGS. 30-35 show a cylindrical shaped magnetic piston 6 in different views that can be used in Maps engines. The hollow piston casing 11 is made up of non-magnetic stainless steel, titanium or similar materials of high resistivity and low electrical conductivity. Alternatively, piston casing 11 can also be made up of non-metallic, thermal resistant materials as well or can be made by integrating both non-magnetic and non-metallic materials. One end of the hollow case 11 is fitted with a powerful permanent magnet 1 made of neodymium-iron-boron (NdFeB), samarium-cobalt (SmCo) or similar high field strength magnetic materials. The permanent magnet 1 acts as the core of the piston 6. The flat surface (which is also the pole of the magnet 1) of the piston 6 that is nearer to the RAT plate 4 (FIG. 28) is called the magnetic head 9 of the piston 6 or piston head 6. The flat surface of the piston head 6 may be completely exposed (FIG. 34) or it may be covered by a thin layer 21 of non-magnetic material of sufficient thickness as in FIG. 35. The other end of the piston case 11 connects to the piston rod 7 (FIG. 28) that connects to the crankshaft 8 (FIG. 28). The crankshaft 8 and the piston rod 7 convert the linear reciprocating movement of the piston 6 to the circular movement. It must be noted that the magnet 1 as such does not make any physical contact with the inner surface of the stationary non-magnetic cylinder 10 (FIG. 28). Only the non-magnetic piston case 11, which holds the magnet 1, makes the physical contact with the inner surface of the cylinder 10 at all times.

6.2 Maps Engine Cylinder

Figure 36:
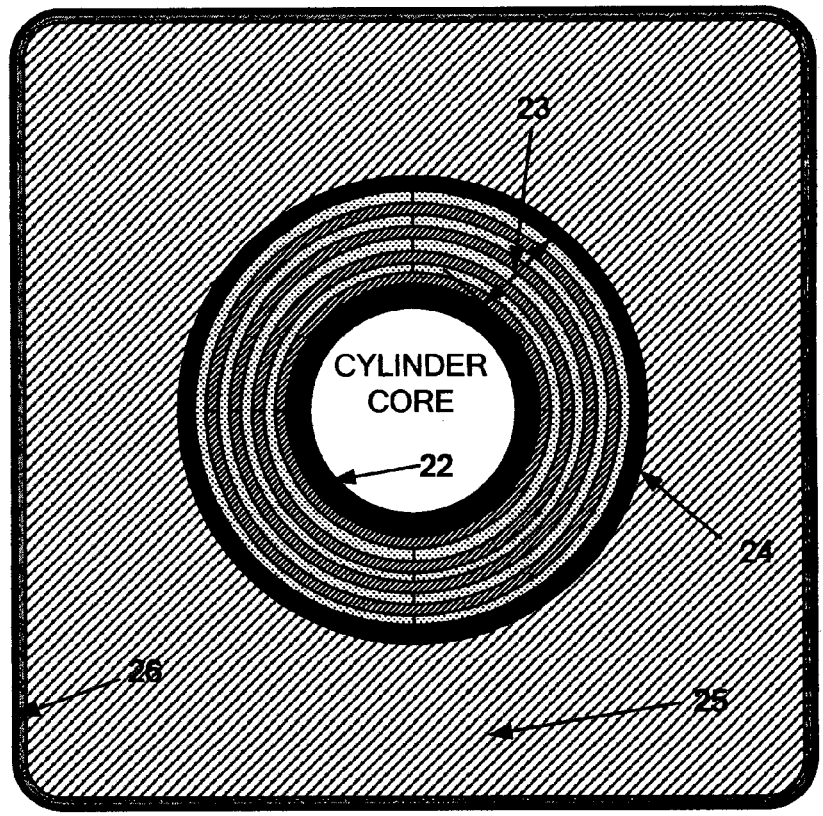
FIG. 36 shows the cross-sectional view of a typical non-magnetic (but metallic) piston cylinder shown inside the casing of the Maps engine.
Figures 37, 38:
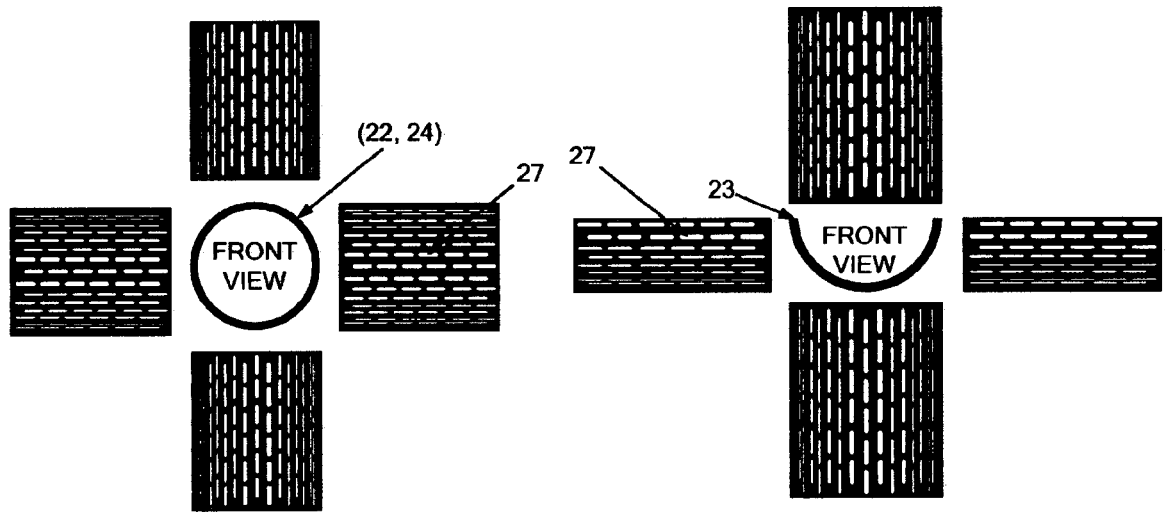
FIG. 37 shows the front and side elevation views of a typical non-magnetic (but metallic), inner and outer tubes used in the construction of Maps engine cylinder.
FIG. 38 shows the front and side elevation views of non-magnetic (but metallic), semi-circular laminations used for making intermediate concentric tube used in the construction of Maps engine cylinder.

FIG. 36-38 shows typical kind of (non-magnetic metallic) cylinder 10 construction that is needed in Magnetic pistons engine. This is in contrast to the cylinders 10 normally used in other reciprocating engines. Since Maps engine uses only magnets 1 for its operation, the cylinder 10 must take care of unwanted magnetic fields and other losses. Further, the cylinder material itself should not get attracted to the magnets 1 and resist the movement of the pistons 6.

To take care of above issues, the cylinder 10 must be only made up of non-magnetic materials such as stainless steel, titanium or similar materials of high resistivity and low electrical conductivity. Alternatively, cylinder 10 can also be made up of non-metallic, thermal resistant materials as well or can be made by integrating both non-magnetic and non-metallic materials. In case of non-magnetic metallic material and when ever needed, the cylinder 10 will have inner tube 22, outer tube 24 and intermediate semi-cylindrical shaped concentric laminations 23. Also, the inner tube 22 of the cylinder 10 will have small, linear slots 27 around it. Further, the intermediate concentric laminations 23 are made up of several layers of semi-cylindrical shaped, slotted 27 laminations 23 that are individually insulated and pressed together in a staggered manner that is sandwiched in between the inner and outer tunes (22, 24). This method of construction of cylinder 10 minimizes the eddy current loops by restricting the eddy current flow within the very small areas of the individual laminations 23 and slots 27 during the pistons 6 movement.

The outer case 26 of the complete engine is made up of high permeability ferromagnetic material such as iron, nickel, cobalt etc. High permeability ferromagnetic material helps in effectively shielding the generated magnetic field within the engine. The large gap between the outer tube 24 and the engine casing 26 may be filled with any light-weight, non-metallic thermal resistant material 25. Larger gap between the outer tube 24 and the engine casing 26 helps in reducing the magnetic effect on the surroundings.

6.3 Rat Plate

Figures 39, 40:
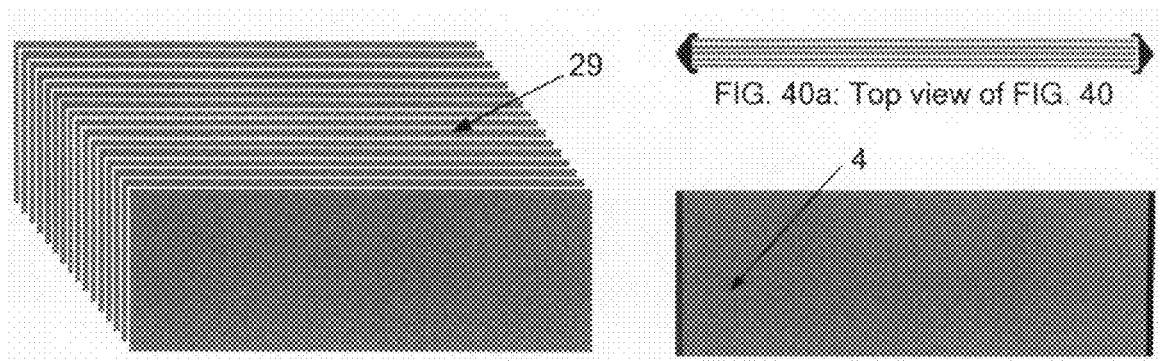
FIG. 39 shows the ferromagnetic laminations used in the construction of RAT plate.
FIG. 40 shows the front side elevation view of RAT plate constructed using the laminations shown in FIG. 39 for use in Maps engine.

Refer FIG. 39-40. The Repulsion-Attraction plate 4, also called RAT plate 4, is one of the most important elements of the Magnetic pistons engine. Since the RAT plate 4 assists in attracting and repelling the like poles of the magnets 1, the material used for the construction of the RAT plate 4 is very critical. The RAT plate 4 must be made up of ferromagnetic material that can readily be attracted by the magnets 1. Once attracted, very minimum force must be able to separate the RAT plate 4 from the magnets 1. High permeability ferromagnetic materials such as iron, nickel, cobalt, etc. are few possible choices for RAT plate 4 construction.

In addition to proper selection of the materials, proper construction of RAT plate 4 is also very important. By default, the RAT plate 4 must be made up of very thin laminations 29 of ferromagnetic material that are individually insulated and pressed to form a single RAT plate 4 of sufficient thickness. This helps in minimizing the eddy current effects and other losses that can otherwise occur during the operation of the RAT plate 4 in the magnetic field. Figure shows one way of constructing the RAT plate 4.

6.4 Rat Plate Driver

The RAT plate driver 14 (FIG. 28) is meant to insert and remove (back and forth) the RAT plate 4 in between the magnetic piston heads 9 to generate the required repulsion and attraction strokes. The RAT plate 4 can be driven by several methods. The method of driving is not important so long the driver 14 can accomplish the required push-pull task that is in sync with the piston's 6 movement. Electrical, pneumatic or steam power sources are most commonly used for driving the RAT plate 4. Further, the RAT plate 4 can be driven directly by a linear driver or indirectly by a reciprocating driver or by any other means.

In case of direct linear driving, back-and-forth movement of the RAT plate 4 is accomplished by connecting the RAT plate 4 to the plunger of an electromagnetic solenoid or to the pneumatic/steam powered pistons.

FIGS. 41-44 show the direct linear driving of the RAT plate 4 using an electromagnetic solenoid 34. The electromagnetic plunger 30 and hence the RAT plate 4 attached to it moves back-and-forth according to the applied RAT plate control pulses (Refer FIG. 28). This creates the attraction and repulsion of the magnetic pistons 6. Since the RAT control pulses are synchronized and derived from the TDC/BDC position pulses (FIG.28), the magnetic pistons 6 operate accordingly and in sync with the RAT plate 4 movement.

In case of pneumatic or steam powered direct linear driving, back-and-forth movement of the RAT plate 4 is accomplished by a pneumatic or steam power operated piston rod that moves inside a cylinder.

To ensure noiseless operation, the plunger 30 that moves inside the solenoid 34 (or piston rod that moves inside the pneumatic/steam operated cylinder) can be stopped by the magnetic repulsion means when it reaches the extreme ends inside the solenoid 34. To accomplish this, the movable plunger 30 is fitted with a magnet 32. The like pole of the stationary magnet stopper 33 faces the like pole of the plunger magnet 32. The magnets 1 help in providing the sufficient repulsion force and avoid direct contact with the plunger 30 when the plunger 30 reaches either ends.

Figures 41, 42:
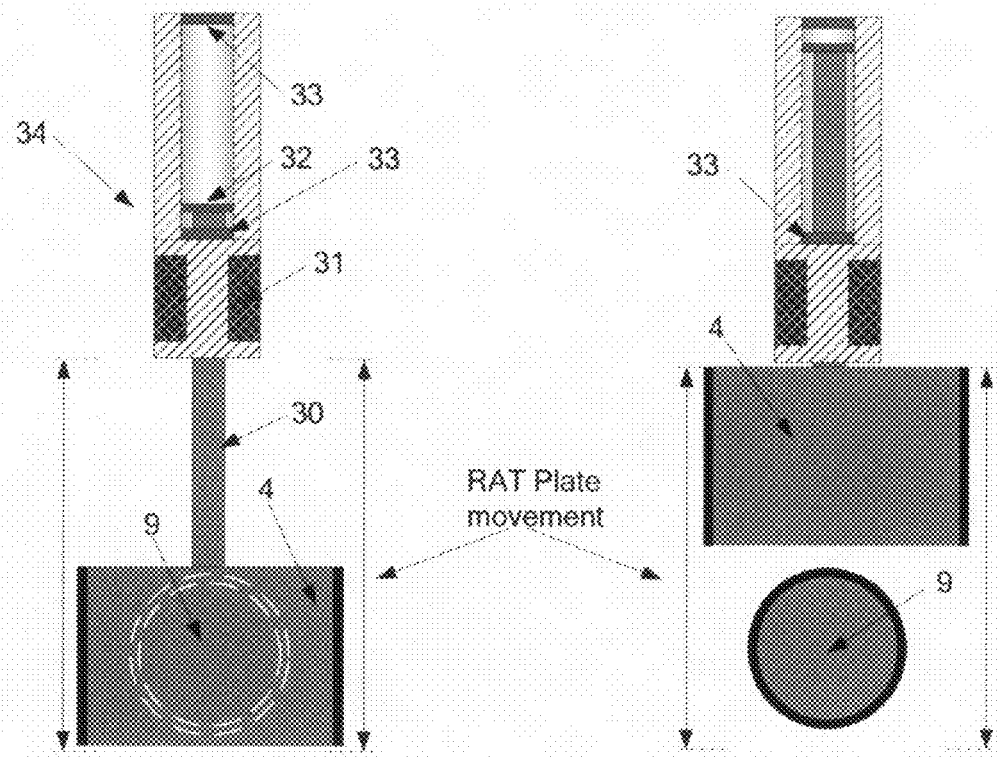
FIG. 41 shows the electromagnetic solenoid type direct linear driver used for driving RAT plate. The RAT plate, which is operated by the movable plunger, is pushed in between the like pole piston heads during the attraction stroke. Note that the dotted circle shows piston head on one side of the RAT plate.
FIG. 42 shows the electromagnetic solenoid operated RAT plate pulled-out from in-between the like pole piston heads during the repulsion stroke.
Figures 43, 44:
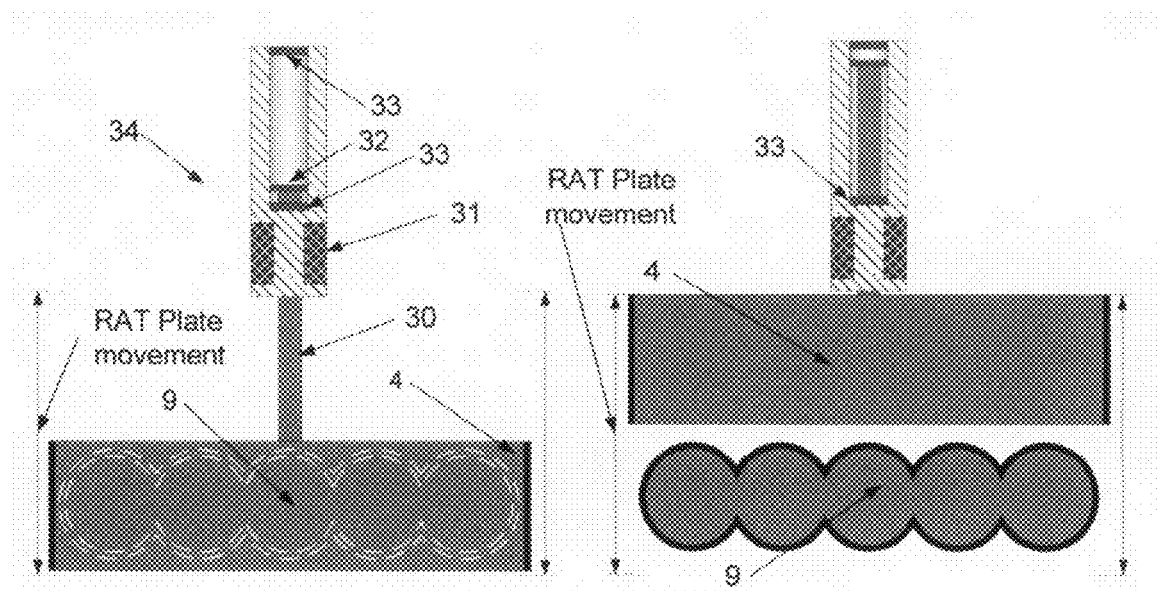
FIG. 43 shows the electromagnetic solenoid operated RAT plate pushed-in between the large, non-cylindrical like pole piston heads (only one side piston head is shown) during the attraction stroke.
FIG. 44 shows the electromagnetic solenoid operated RAT plate pulled-out from in-between the large, non-cylindrical like pole piston heads (magazine shown in figure) during the repulsion stroke.

FIGS. 41 and 43 show the RAT plate 4 inserted in between the magnetic pistons 6 during the attraction stroke. FIGS. 42 and 44 show the RAT plate 4 pulled-out from in-between the magnetic pistons 6 during the repulsion stroke.

FIGS. 45-48 show the indirect driving of RAT plate 4 using a reciprocating rod 36 driven by a rotating driver wheel 35. The motor (not shown) that operates the driver wheel 35 can be driven by various sources. Pneumatic, electric, storage power are some of the possible choices of energy sources. Renewable natural sources such as wind power, water power, solar power, etc. can also be used to drive the wheel 35. For precise speed control of the engine, electrically operated stepper motor based reciprocating driving of RAT plate 4 is the preferred choice.

Figures 45, 46:
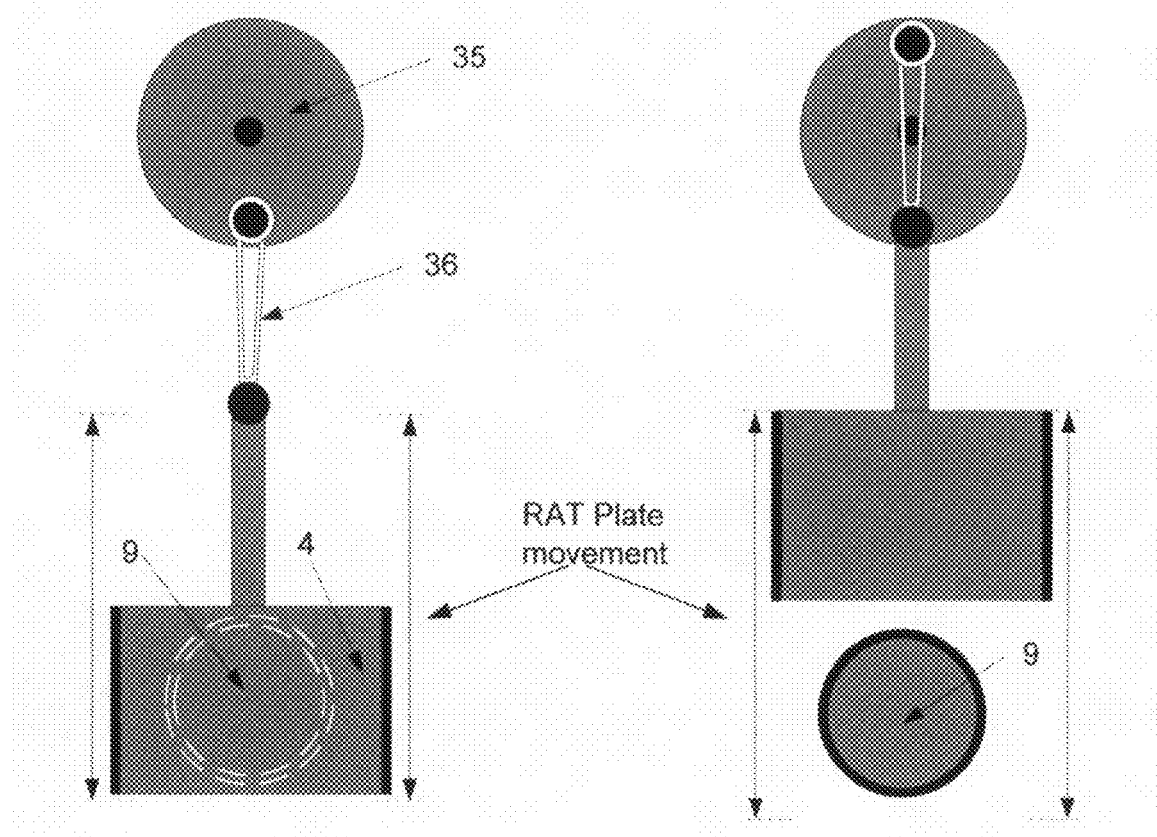
FIG. 45 shows the operation of indirect, reciprocating type RAT plate driver. The RAT plate (that is operated by the reciprocating rod, identified by arrow 36) is pushed-in between the like pole piston heads during the attraction stroke.
FIG. 46 shows the indirectly driven RAT plate pulled-out from in-between the like pole piston heads during the repulsion stroke.
Figures 47, 48:
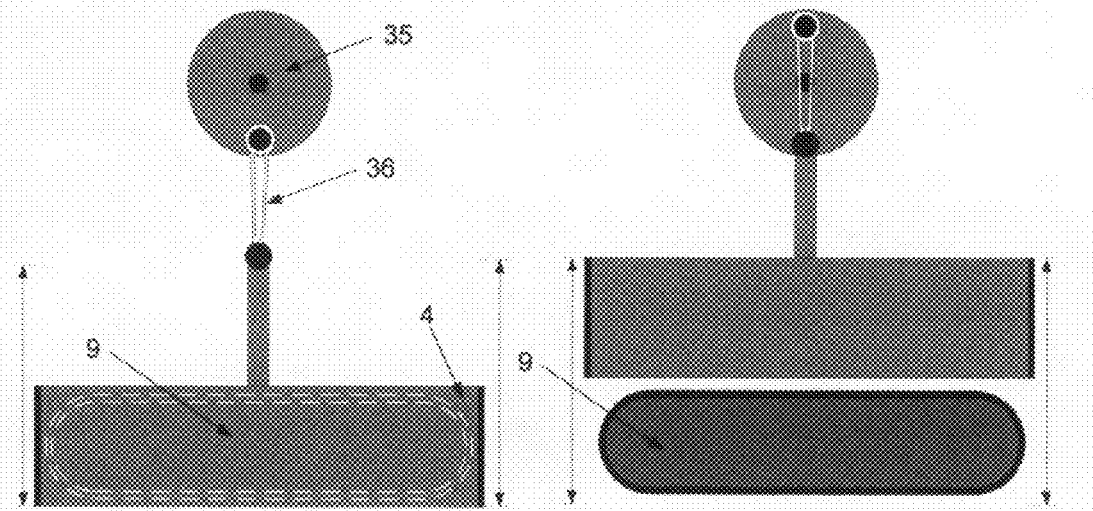
FIG. 47 shows the indirectly driven RAT plate pushed-in between large, non-cylindrical like pole piston heads during the attraction stroke.
FIG. 48 shows the indirectly driven RAT plate pulled-out from in-between the large, non-cylindrical like pole piston heads (oval shown in figure) during the repulsion stroke.

FIGS. 45 and 47 show the RAT plate 4 inserted in between the magnetic pistons 6 during the attraction stroke. FIGS. 46 and 48 show the RAT plate 4 pulled-out from in-between the magnetic pistons 6 during the repulsion stroke.

Figure 49:
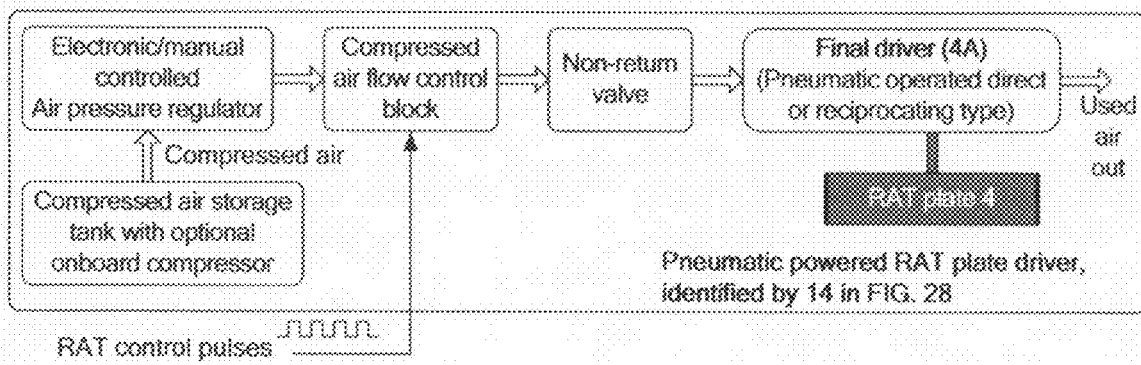
FIG. 49 shows the pneumatic powered RAT plate driver, identified by block 14 in FIG. 28.
Figure 50:
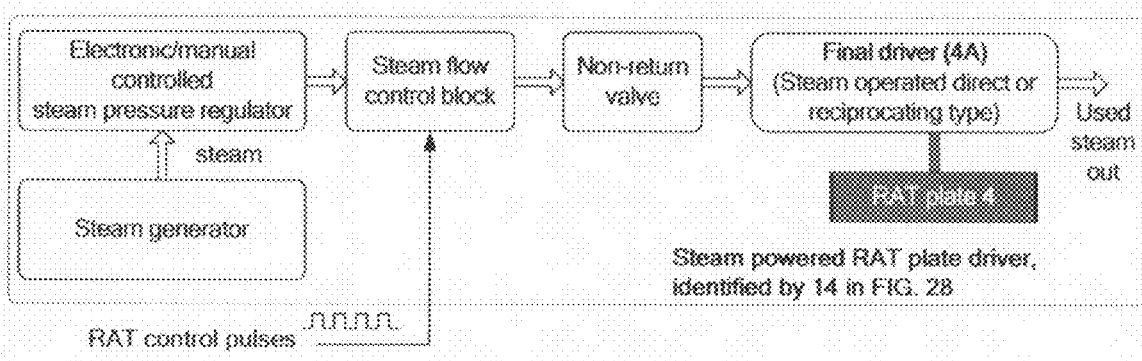
FIG. 50 shows the steam powered RAT plate driver, identified by block 14 in FIG. 28.

While the RAT plate 4 driving using electrical power is very simple, pneumatic or steam power based RAT plate 4 driving may be used in Magnetic piston engines. FIGS. 49-50 show the pneumatic and steam power based RAT plate drivers (identified as RAT plate driver 14 in FIG. 28) that can be used in Maps engine. The final driver block 4A may consist of linear or reciprocating driver. Note that the electric power is still used to control and regulate the pneumatic/steam supply. However, the electric power needed to control and regulate the pneumatic/steam power supply is negligible. The final driver block 4A uses the actual pneumatic/steam power source to accomplish the RAT plate 4 push/pull task.

In all the above methods of driving, the power consumed to operate the RAT plate 4 and hence the magnetic pistons 6 is much less than the power generated by the back-and-fort, linear motion of the magnetic pistons 6. Hence, Maps engine can work at very high efficiency with the possibility of reaching unity-over operation mode.

6.5 TDC/BDC Position Detector

Figures 51, 52:
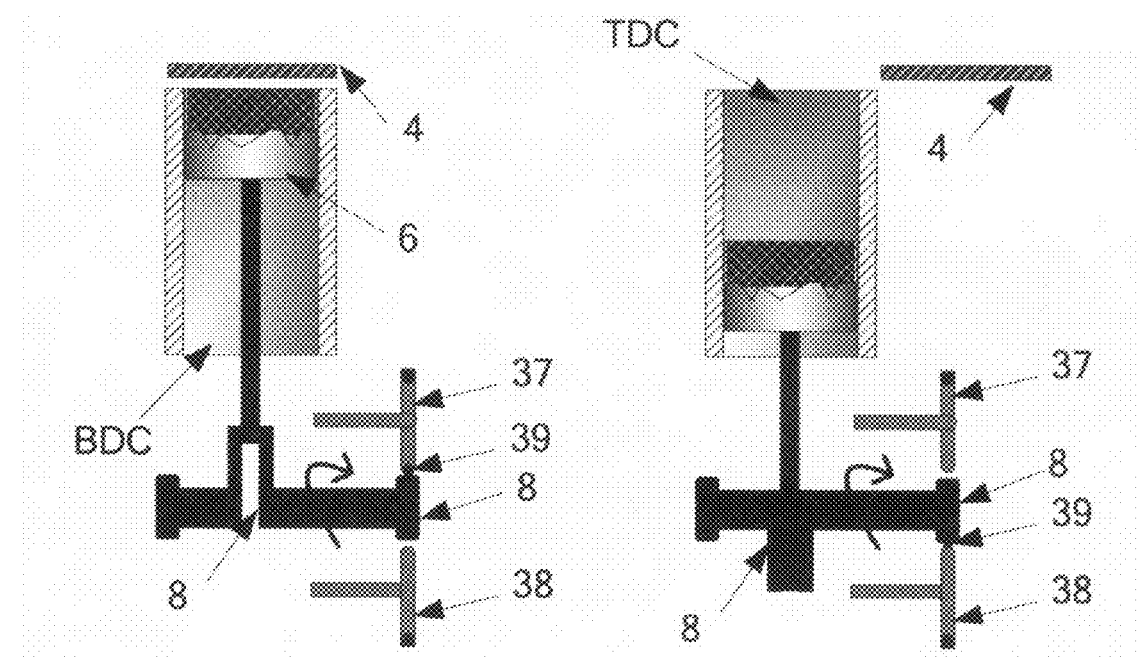
FIG. 51 shows CAM operated TDC/BDC (Top Dead Center/Bottom Dead Center) position detection and pulse generation system when the piston is at Top Dead Center.
FIG. 52 shows CAM operated TDC/BDC (Top Dead Center/Bottom Dead Center) position detection and pulse generation system when the piston is at Bottom Dead Center.

The precise timing and synchronization of the RAT plate 4 movement with respect to magnetic pistons 6 movement is highly critical for the operation of Maps engine. One way to accomplish this is to track the pistons 6 positions and accordingly generate the position detect pulses (FIGS. 28 and 29) when the pistons reach the Top and Bottom dead centers (FIGS. 51 and 52). The position detect pulses can then be used to generate the synchronized RAT control pulses. This ensures that the RAT plate 4 and the pistons 6 movement are synchronized at all times.

The TDC/BDC position detector block 15 shown in FIG. 28 performs the pistons 6 position detection and generation of detection pulses. The actual piston position detection can be done in several ways including electronic, electrical, mechanical or electromechanical means.

Figure 53:
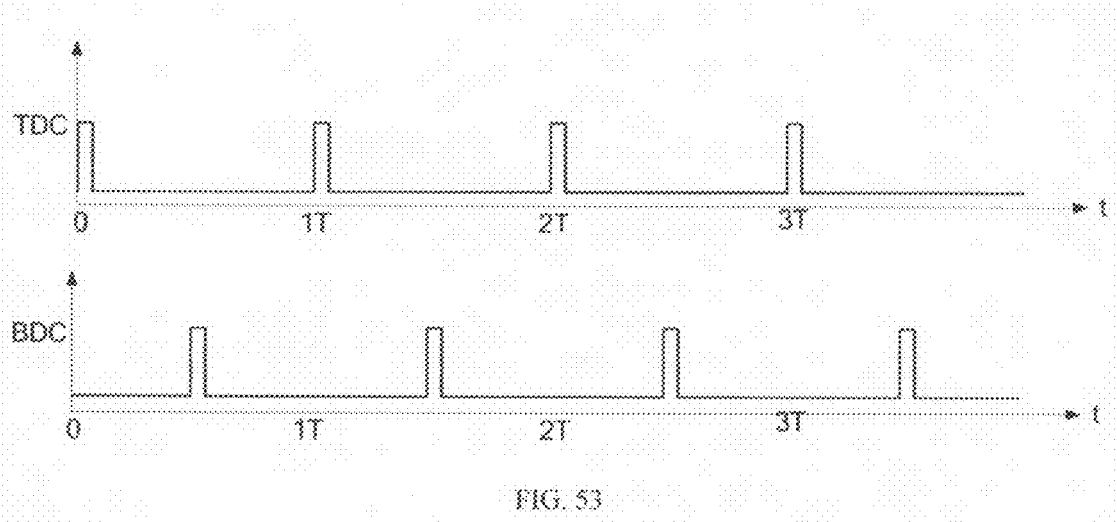
FIG. 53 shows separate TDC and BDC pulse trains generated using TDC/BDC position detector and pulse generator system shown in FIG. 51/52.

FIGS. 51-52 show a simple method of TDC/BDC detection and pulse generation by electromechanical means. In this method, a notch 39 on the crankshaft 8 operates a pair of switches (37, 38), one meant for TDC and the other for BDC. The notch 39 operates the switches (37, 38) one at a time when the piston 6 reaches dead centers. Every time the piston reaches TDC (FIG. 51), the notch 39 operates the TDC switch 37 thereby generating a TDC voltage pulse. Similarly, when the piston 6 is at BDC (FIG. 52), the BDC switch (38) is operated, thereby generating a BDC voltage pulse. Since the piston 6 operates continuously, two independent pulse trains are generated as shown in FIG. 53. The pulse trains are fed to central processor (block 16 of FIG. 28) in real time to generate the synchronized RAT plate 4 control pulses.

FIGS. 54-55 show another way of generating TDC/BDC detection pulses. In this case, an optical detection system is used. It consists of a mechanical wheel 44 with a hole 45 that rotates in between two optical switches (40, 41), one meant for TDC and the other for BDC. The optical switches (40, 41) will turn ON when the light beam generated by the respective photo diodes (42*p*, 43*p*) directly falls on the corresponding detectors (42*d*, 43*d*) located inside the switch (40, 41). The switches (40, 41) will be OFF during the rest of the time.

During the continuous rotation of the wheel 44 fitted to the crankshaft 8, the hole 45 crosses both the switches (40, 41) during every rotation. When the hole 45 is in between the photo diode 42*p* and the detector 42*d*, the optical switch 40 turns ON and the TDC pulses is generated. Similarly, when the hole 45 is in between the photo diode 43*p* and the detector 43*d*, the optical switch 41 turns ON and the BDC pulses is generated. Since the pistons 6 operate continuously, two independent pulse trains are generated as shown in FIG. 53. The pulse trains are fed to central processor 16 (FIG. 28) in real time to generate the synchronized RAT control pulses.

Important note: By default, Maps engine employs non-staggered movement of pistons in a multi-cylinder engine (Refer section 8 for details). Hence, in a multi-cylinder engine, all pistons simultaneously reach the Top Dead Center (TDC) and Bottom Dead Center (BDC) during every operation cycle (Refer FIGS. 22-27 and 57).

7. Speed Control

The speed and the force with which the magnetic pistons 1 operate are directly proportional to RAT plate 4 push pull operation speed. This in turn decides the speed of the engine. Hence, the speed of Maps engine can be controlled in several ways.

One way is to vary the frequency of the RAT control pulses. This varies the speed at which the RAT plate 4 operates.

Higher the frequency causes the RAT plate 4 to cycle faster causing the engine to run faster and vice versa.

Another method is to introduce skip pulses in between the regular RAT control pulses when the engine is set to run at a particular frequency. The skip pulses put the RAT plate 4 in idle state for the skip duration. This causes the engine to slow down until the next valid RAT control pulse operates the RAT plate 4.

In case of pneumatic/steam driven RAT plate 4, the amount of air/steam used, the pressure at which the air/steam is released inside the pneumatic/steam cylinder driver (block 4A of FIGS. 49 and 50) that controls the RAT plate 4 and the frequency of air/steam release (i.e., number of times the air/steam valve is kept ON in one second) decides the operation speed of the RAT plate 4 and hence the speed of the engine.

8. Multi-Cylinder Configuration

In multi-cylinder Internal Combustion engines, the piston operation cycles are evenly staggered for smooth operation. However, each cylinder will go through a complete operation cycle for every revolution of the crankshaft. This is possible in any traditional engines since individual piston's movement is not affected by strong, surrounding magnetic fields.

However, Maps engine works purely on the principle of magnetism. The piston magnets 1 always try to attract or repel one another when they come near each others field. Hence, it must be ensured that no two adjacent pistons of a particular row come in the vicinity of each others magnetic field. In the absence of proper magnetic shielding between the individual cylinders 10 (and hence the pistons) of a particular row, the multi-cylinder 10 concept that is normally used in traditional, Internal Combustion engines cannot be readily applied to Maps engine. Let us understand the issues that can arise due to improper shielding between cylinders 10 of a particular row in staggered and non-staggered Maps engines.

FIG. 56 shows a multi-cylinder engine with the pistons ABCD (and $A_I B_I C_I D_I$) configured in staggered manner. When the pistons A, D are near TDC, the pistons B, C will be near BDC and vice-versa. Hence the unlike poles (flat surfaces) of magnets 1 of pistons A, D will attract the unlike poles of the magnets of pistons B, C forming a strong bond between pistons AB and CD as shown by the arrows. Similarly, $A_I B_I$ will bond with $C_I D_I$. This creates latching of adjacent pistons of a particular row and the loss of energy thereby failing the engine to operate properly. In addition, there exists a sidewise force of repulsion between the cylindrical surfaces of adjacent pistons of a particular row when they cross each other resulting in the loss of energy.

Figure 57:
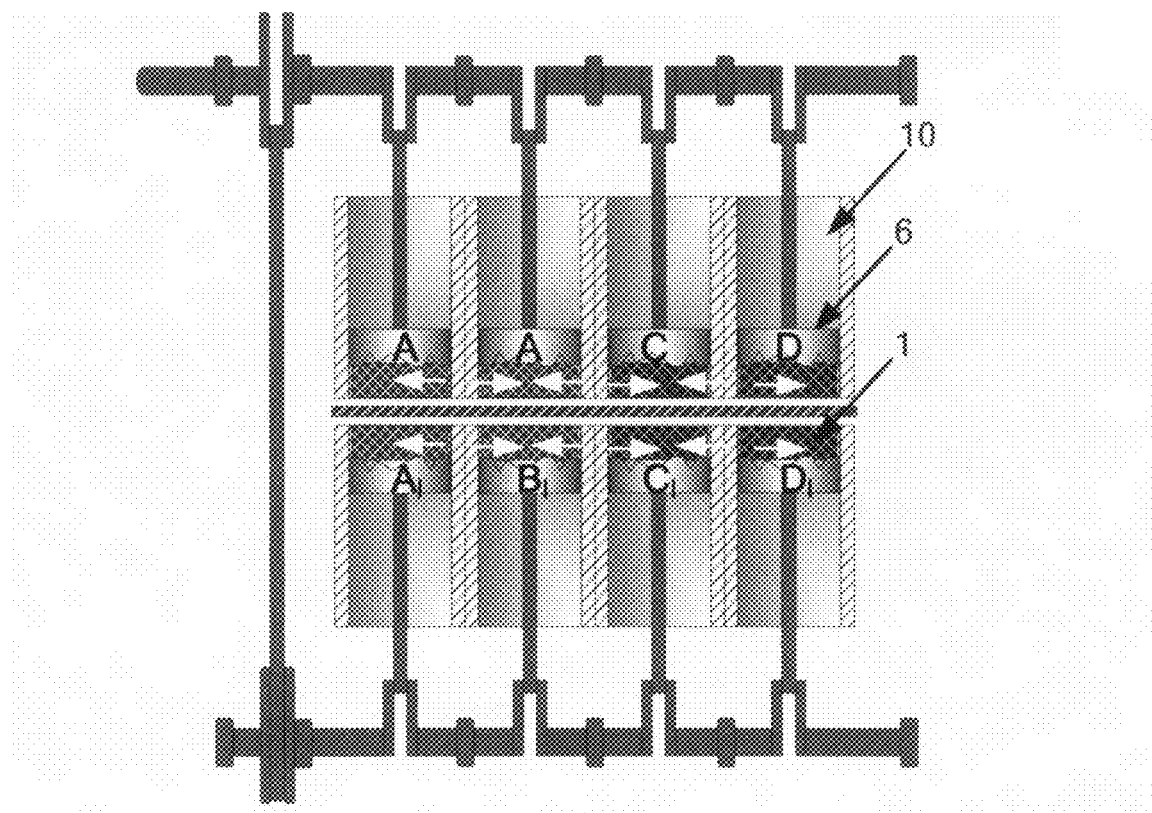
FIG. 57 shows the non-staggered multi-cylinder Magnetic pistons engine.

FIG. 57 shows the pistons ABCD (and $A_I B_I C_I D_I$) configured in a non-staggered manner to eliminate the latching problem that occurs due to staggering. This time, all the pistons of a particular row, say ABCD, are allowed to move simultaneously towards TDC or BDC. Since the unlike poles (flat surface) of the magnet 1 of the adjacent pistons in ABCD row will never face each other, the direct latching problem between ABCD themselves can never occur. Similarly for $A_I B_I C_I D_I$. Further, with proper shielding, the sidewise force of repulsion that exists between the cylindrical surfaces of adjacent pistons (shown by the arrows) of a particular row can be minimized.

Figure 57A:
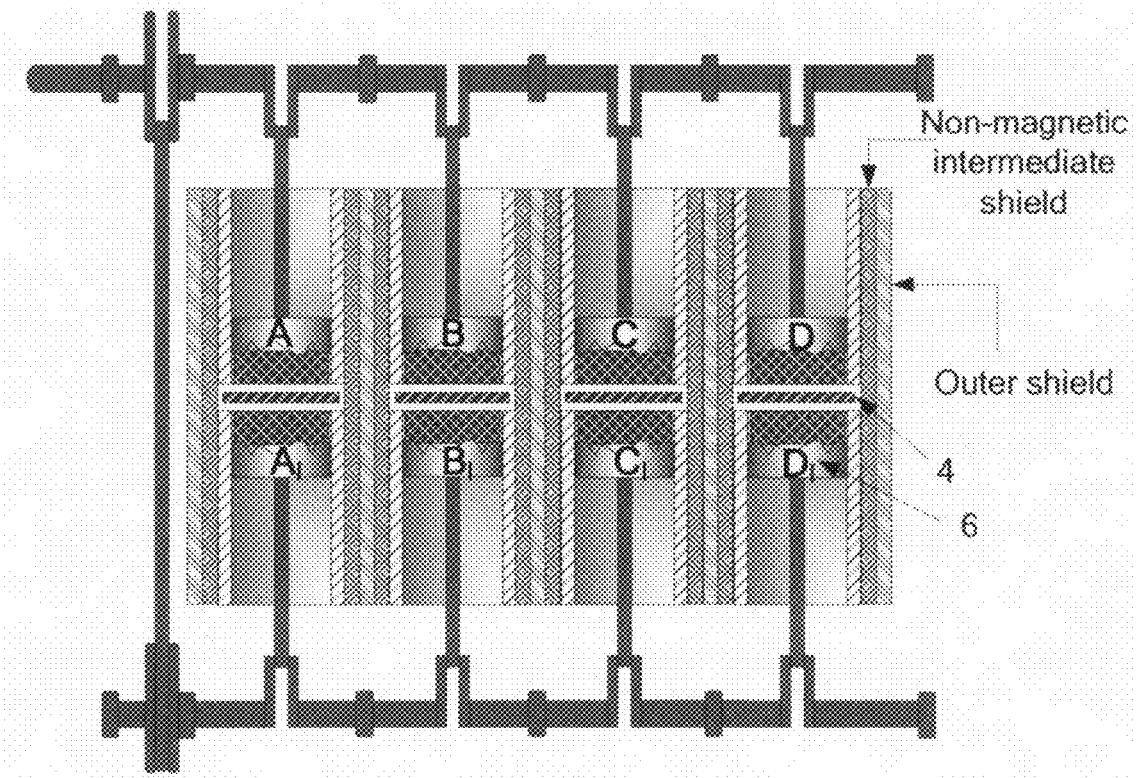
FIG. 57a shows the non-staggered, multi-cylinder Magnetic pistons engine with sufficient shielding in between the adjacent cylinders to minimize the magnetic effect on each other.

Comparing the staggered and non-staggered operation, employing non-staggered operation with proper shielding of individual cylinders of a particular row (as shown in FIG. 57a) is a preferred choice for multi-cylinder Maps engine.

Figure 58:
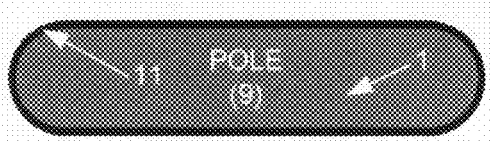
FIG. 58-61 shows various shapes of pistons that can be used in Magnetic pistons engine.
Figure 59:
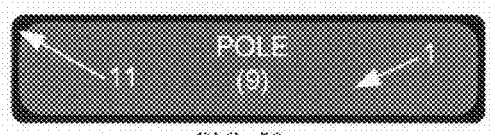
Figure 60:
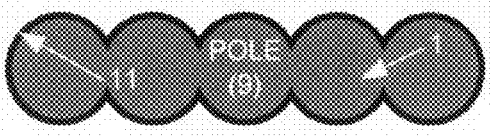
Figure 61:
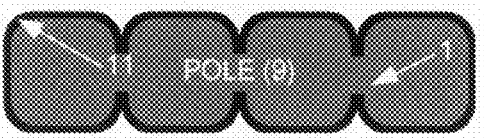
Figure 62:
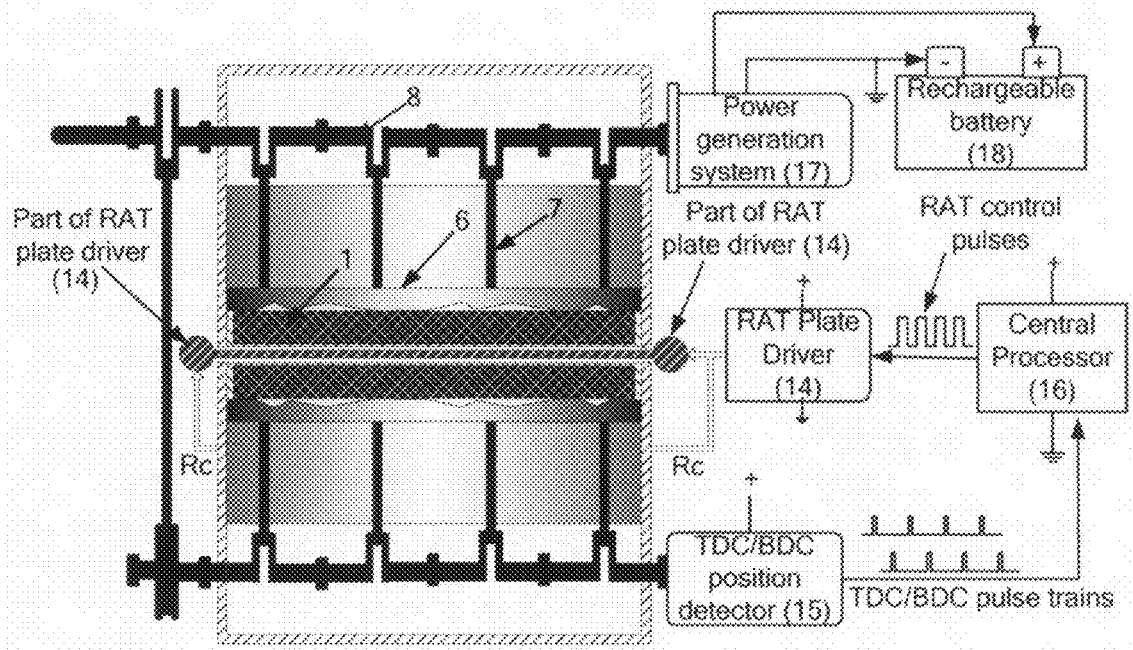
FIG. 62 shows a large, twin-cylinder Magnetic pistons engine using rectangular, oval, magazine or other non-cylindrical shaped magnetic pistons.

In addition to non-staggered operation of pistons in Maps engine, another option is to have only twin-pistons 6 (one for each side) irrespective of the size of the engine. This is possible by having a cylindrical, oval, rectangle, etc. shaped magnet 1 as shown in FIGS. 58-59. Near multi-cylinder 10 configuration can be achieved by having piston 6 that has the shape of an ammunition magazine as shown in FIGS. 60-61. Pistons, 6 having a single large magnet 1 block, made in any convenient shape will be completely free of magnetic filed interference issues. Further, such large piston 6 can be connected to the crankshaft 8 with several piston rods 7 working simultaneously as shown in FIG. 62.

Since the design of the RAT plate 4 depends on the size and width of the engine, more than one RAT plate 4 can be used in all types of Maps engines. Also, multiple RAT plate drivers 14 (FIG. 28) can be used to drive RAT plate(s) 4. This ensures the even distribution of the drive force on the RAT plate(s) 4 during the Push-Pull operation of the RAT plate 4.

9. Paralleling of Map Engines

Figure 63:
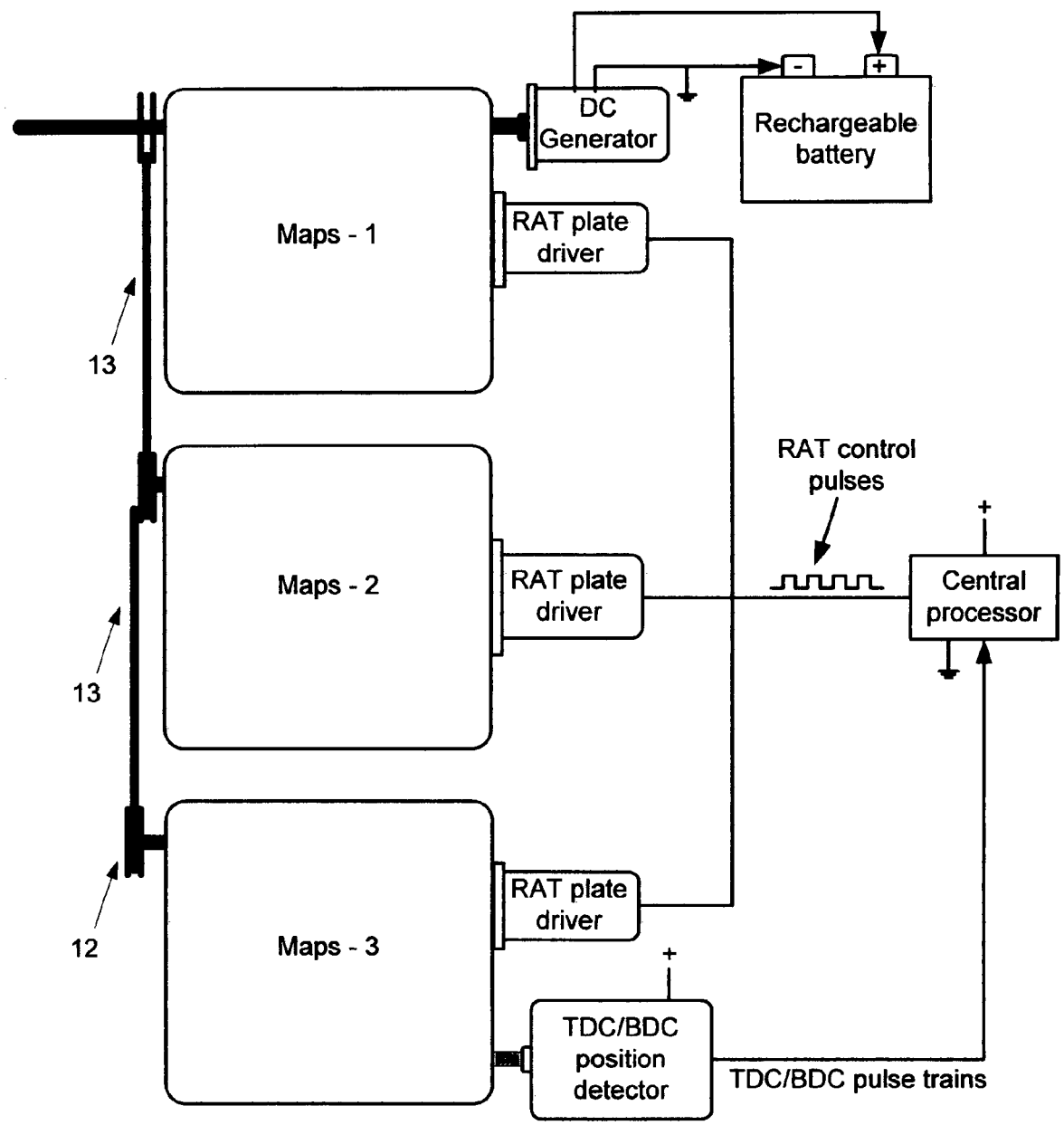
FIG. 63 shows the paralleling of several Maps engine blocks to build large engines.

When the configuration involves large number of cylinders, individual engine blocks can be paralleled by coupling their flywheels 12 by flywheel rods 13 as shown in FIG. 63. Note that all flywheels 12 operate synchronously. This helps in combining and regulating the total energy generated by all reciprocating magnetic pistons 6.

Further, Maps engines can be coupled in Matrix fashion, with engines connected in m*n configuration. For example, 10 engine blocks can be configured in 2*5 (2 rows and 5 columns) or 5*2 (5 rows and 2 columns) matrix configuration.

Whenever needed, Maps engines can be cooled with proper coolant or lubricated with oil or other means to keep the engine from running hot.

10. Drawings

Figure 1:
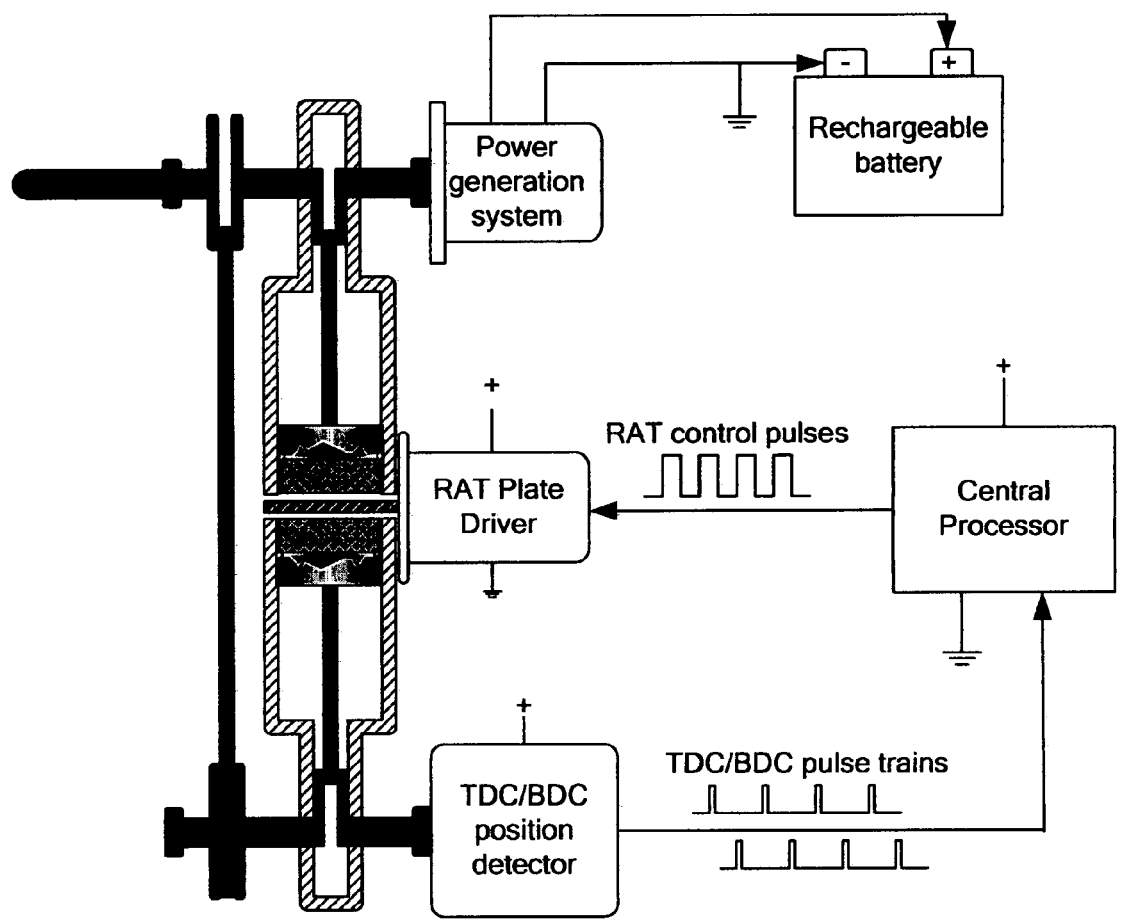
FIG. 1 shows the basic configuration of Magnetic pistons engine, also called Maps engine, RAT engine, or engine with closed loop control.

FIGS. 1-63 attached.

What is claimed is:

1. A Magnetic Pistons engine that works on the principle of magnetic repulsion of like poles, wherein said method is used to build linear reciprocating engines that are integrated with automotive equipments and general equipments and machines to perform various tasks and functions including application of force or displacement of objects, comprising:

at least one pair of magnetic pistons or similar means having like pole heads, wherein said magnetic pistons are attracted towards at least one ferromagnetic plate (sheet) when said ferromagnetic plate is inserted in-between like pole heads of said magnetic pistons, or said magnetic pistons are made to repel from each other by the removal of said ferromagnetic plate that was inserted in-between said like pole heads (for the attraction of said magnetic pistons), causing linear, back-and-forth movement of said magnetic pistons within their respective non-magnetic cylinders.

at least one pair of said non-magnetic (metallic or non-metallic or hybrid) cylinders or similar means to accommodate for the linear, back-and-forth movement of said magnetic pistons within their respective said non-magnetic cylinders.

at least one pair of crankshaft means connected to each row of said magnetic pistons, wherein each said magnetic piston has at least one piston connect rod, wherein said piston connect rod helps in converting the linear reciprocating movement of said magnetic pistons to circular movement of said crankshaft, wherein said crankshaft drives one or more loads.

at least a control system means for detecting and processing said magnetic pistons' positions, wherein said control system means also controls the insertion and removal of said ferromagnetic plate in between said like pole heads of said magnetic pistons, wherein the insertion and removal of said ferromagnetic plate will be in synchronization with said magnetic pistons movement.

2. The magnetic pistons engine of claim 1, where in like pole heads mean all magnetic piston heads in a magnetic pistons engine will have either magnetic North pole or magnetic South pole but not both.

3. The magnetic pistons engine of claim 1, wherein the opposing piston's movement is synchronized such that the like pole heads of said opposing pistons are generally at equidistance from the ferromagnetic plate (i.e., axis of movement of ferromagnetic plate) at all times, wherein said like pole heads always directly face each other when said ferromagnetic plate is pulled-out from in-between said magnetic pistons.

\* \* \* \* \*